(12) United States Patent
Okuda et al.

(10) Patent No.: US 8,231,231 B2
(45) Date of Patent: Jul. 31, 2012

(54) IMAGE DISPLAY DEVICE AND PORTABLE TERMINAL DEVICE

(75) Inventors: Michihiro Okuda, Hirakata (JP); Yoshihiro Yokote, Yokohama (JP); Ryoko Kubo, Ikeda (JP); Takaaki Abe, Osaka (JP); Shinya Matsumoto, Hirakata (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 511 days.

(21) Appl. No.: 12/620,786

(22) Filed: Nov. 18, 2009

(65) Prior Publication Data

US 2010/0060809 A1 Mar. 11, 2010

Related U.S. Application Data

(63) Continuation-in-part of application No. PCT/JP2008/058912, filed on May 15, 2008.

(30) Foreign Application Priority Data

May 18, 2007 (JP) .................................. 2007-133443
May 9, 2008 (JP) .................................. 2008-123529

(51) Int. Cl.
*G03B 21/00* (2006.01)
*G03B 21/26* (2006.01)
*G02B 5/32* (2006.01)

(52) U.S. Cl. .............................. 353/94; 353/122; 359/15

(58) Field of Classification Search ............ 353/85, 353/94, 122; 385/15; 359/13, 15
See application file for complete search history.

(56) References Cited

U.S. PATENT DOCUMENTS

| 7,988,307 | B2 * | 8/2011 | Kamijima ................... 353/122 |
| 8,109,638 | B2 * | 2/2012 | Chen et al. .................... 353/31 |
| 2002/0113912 | A1 * | 8/2002 | Wright et al. .................. 349/13 |
| 2006/0109553 | A1 * | 5/2006 | Serafimovich et al. ....... 359/565 |
| 2006/0250532 | A1 | 11/2006 | Shin |
| 2007/0046907 | A1 | 3/2007 | Shin |
| 2010/0060618 | A1 * | 3/2010 | Okuda et al. ................. 345/204 |

FOREIGN PATENT DOCUMENTS

| JP | 06-105191 A | 4/1994 |
| JP | 2006-323383 A | 11/2006 |
| JP | 2007-065627 A | 3/2007 |
| WO | 02/43041 A1 | 5/2002 |

* cited by examiner

*Primary Examiner* — Tony Ko
*Assistant Examiner* — Jori S Reilly-Diakun
(74) *Attorney, Agent, or Firm* — Marvin A. Motsenbocker; Mots Law, PLLC

(57) ABSTRACT

An image display device includes a light source which emits laser light; an optical element which is operable to switch between a first state for reducing a coherence of the laser light and a second state for substantially maintaining the coherence of the laser light; a switching control circuit which controls the optical element; an imager which modulates the laser light transmitted through the optical element; and a modulation control circuit which controls the imager based on an image signal. The modulation control circuit causes the imager to render an image pattern for generating an image by changing a light amount at each pixel position when the optical element is in the first state, and causes the imager to render a hologram pattern for generating an image by diffraction when the optical element is in the second state.

9 Claims, 23 Drawing Sheets

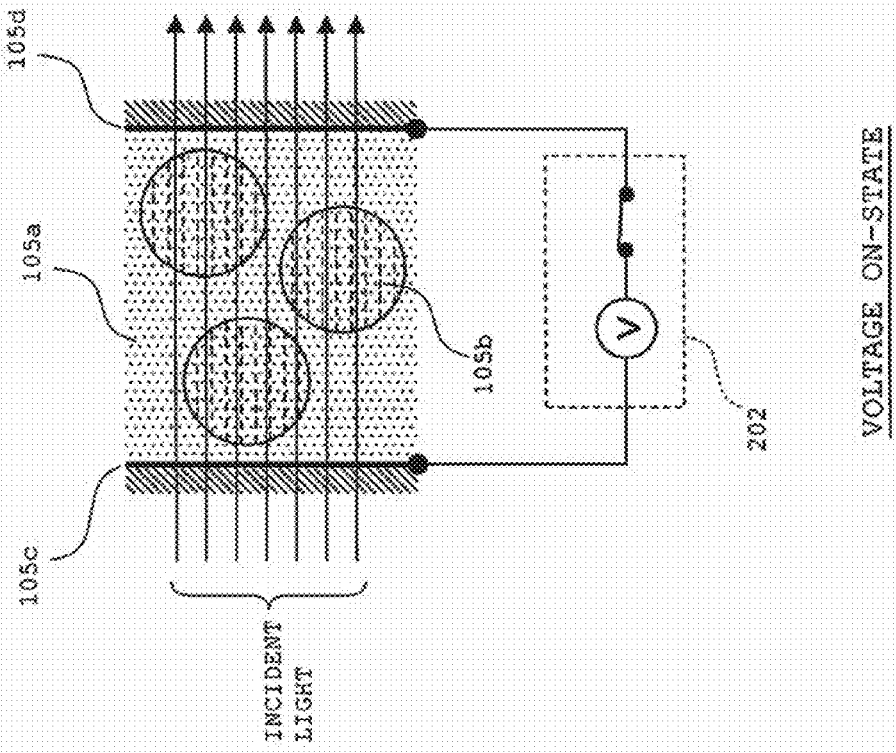
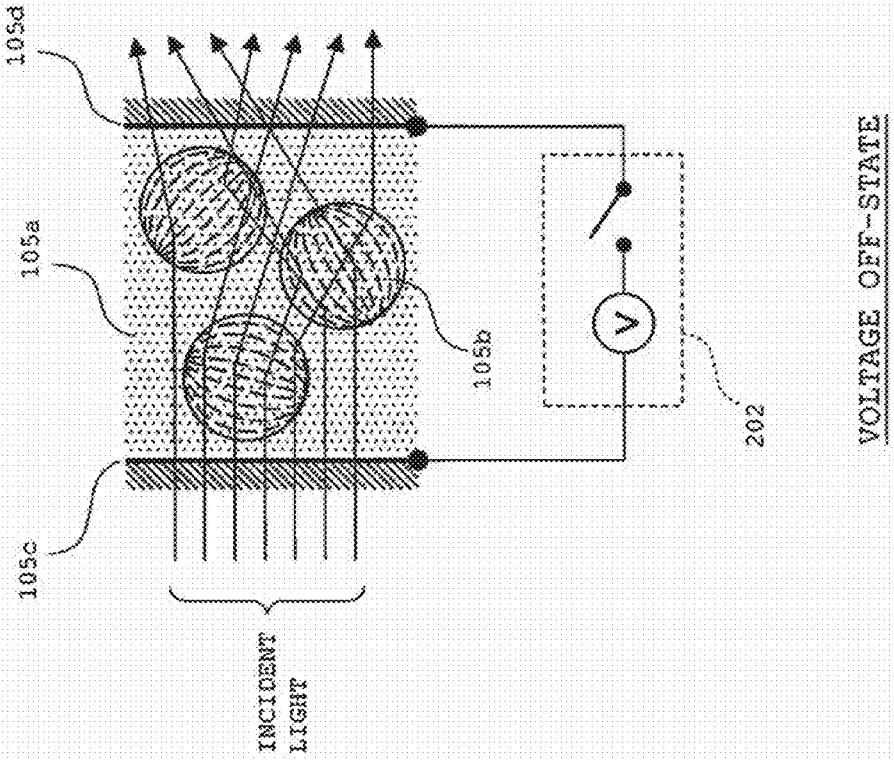

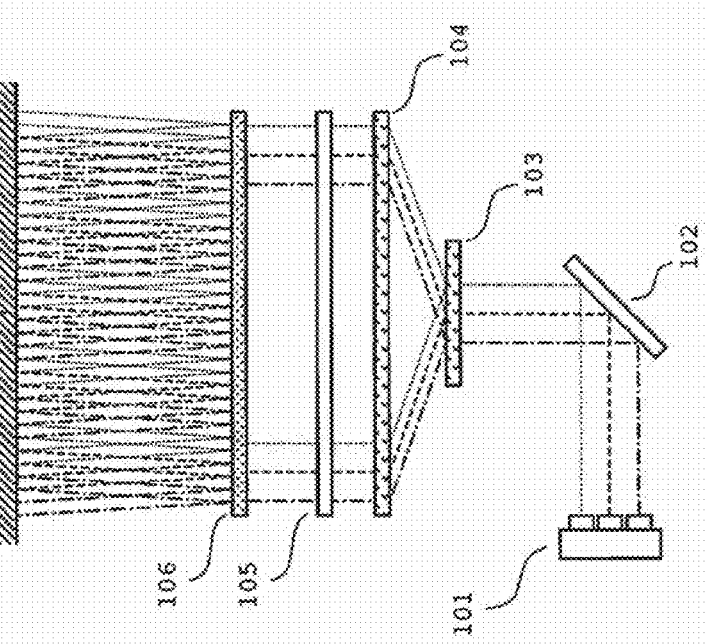
FIG.4B  PROJECTION MODE
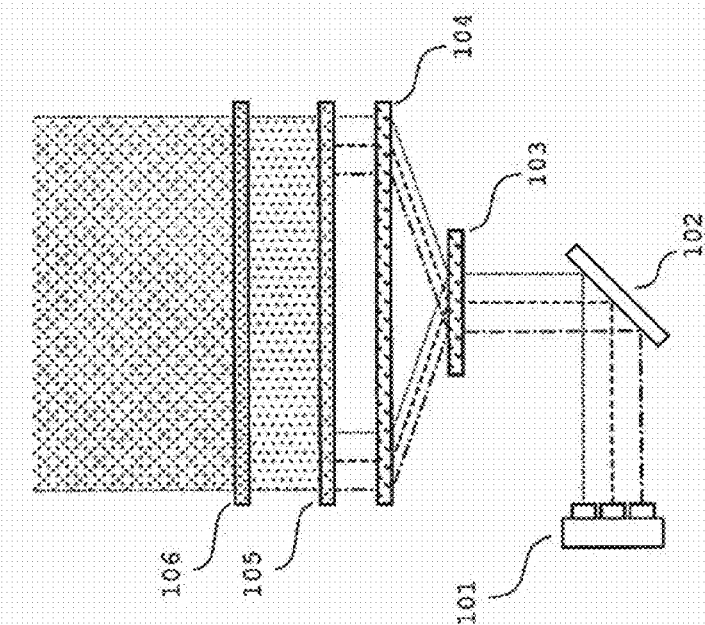
FIG.4A  DIRECT VIEWING MODE

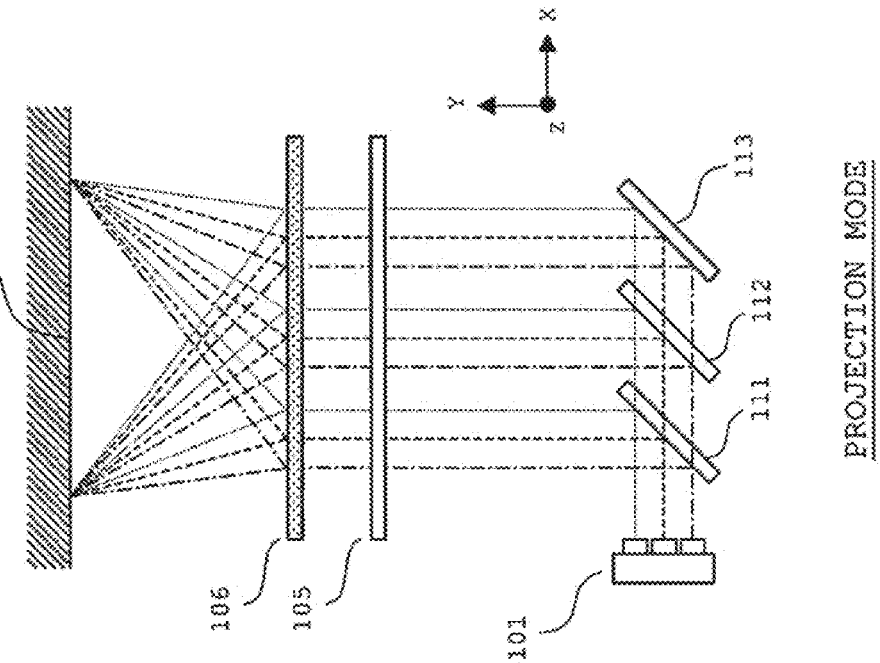
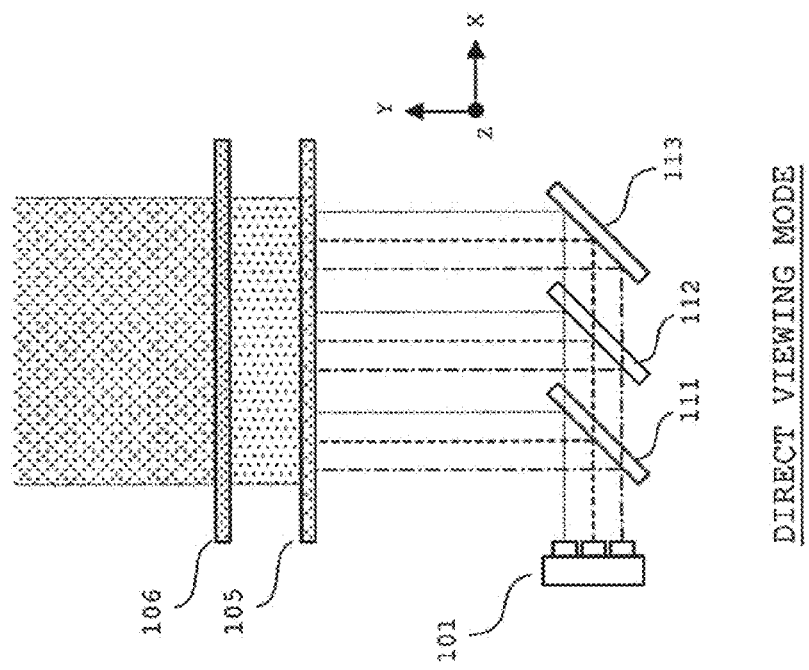

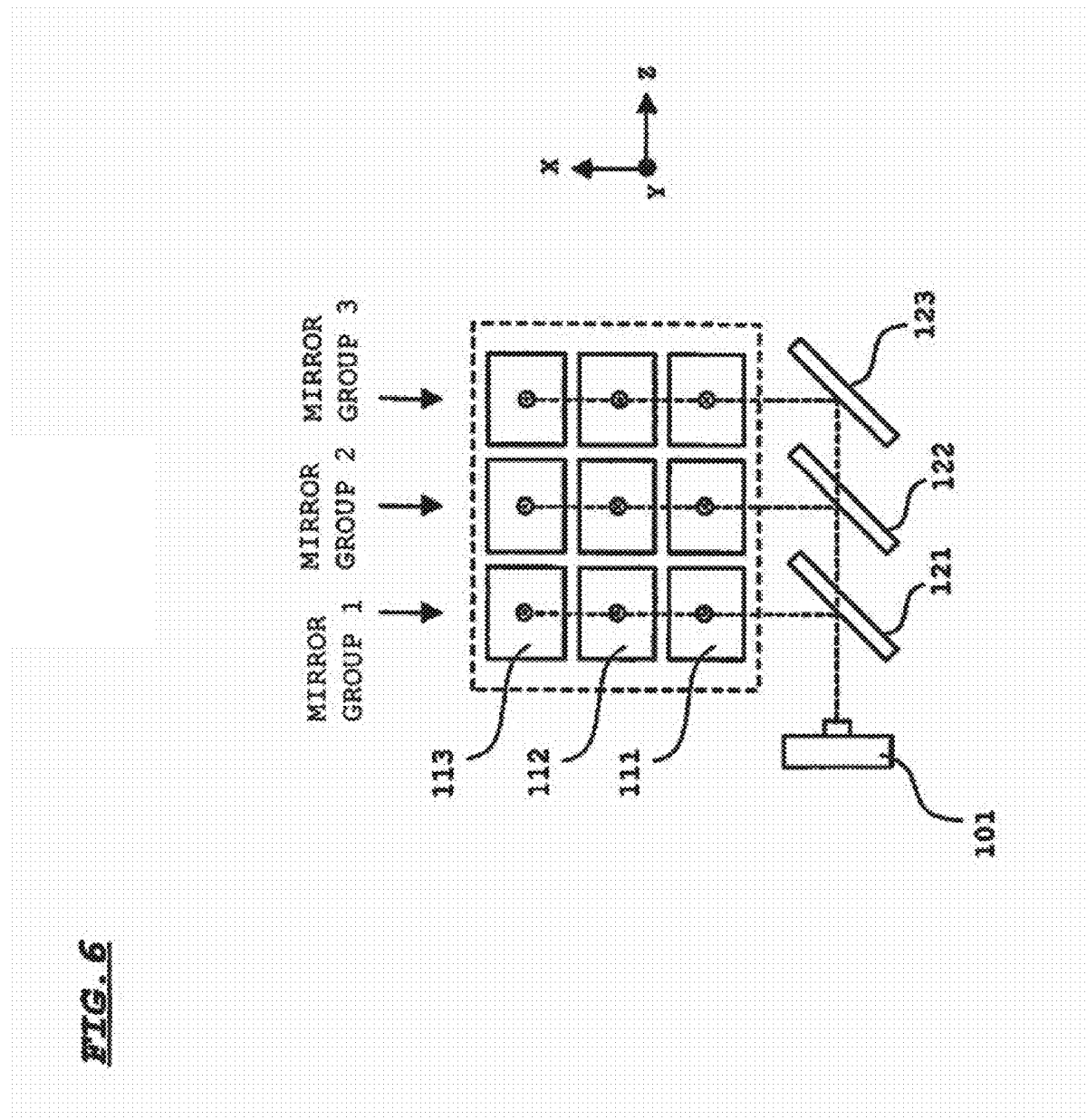

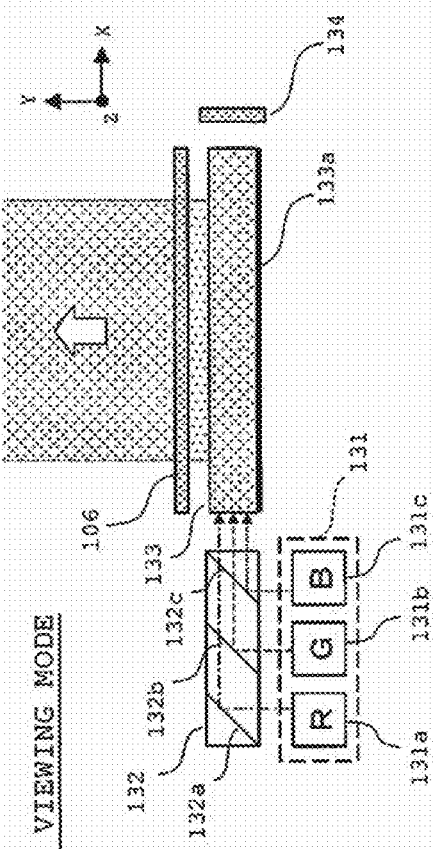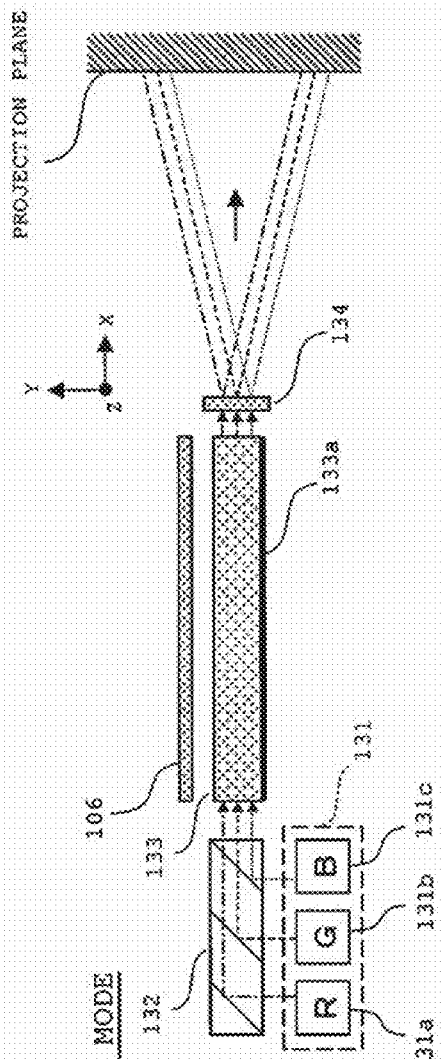

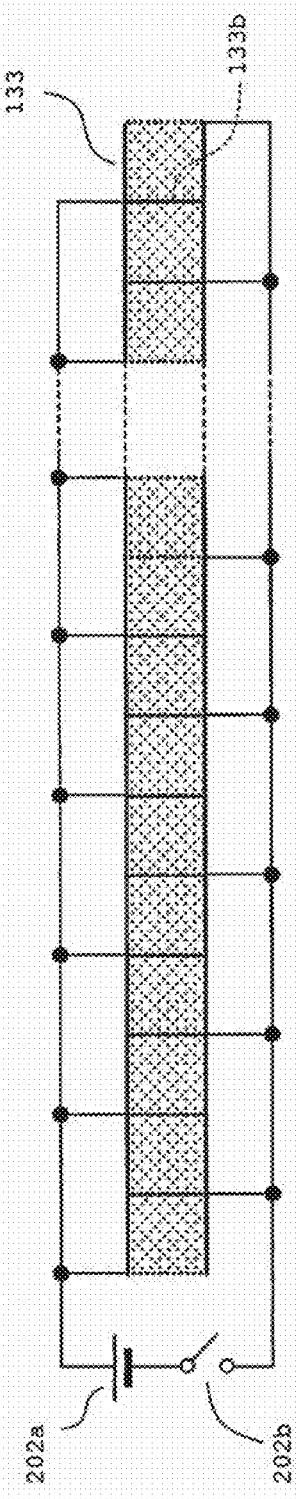
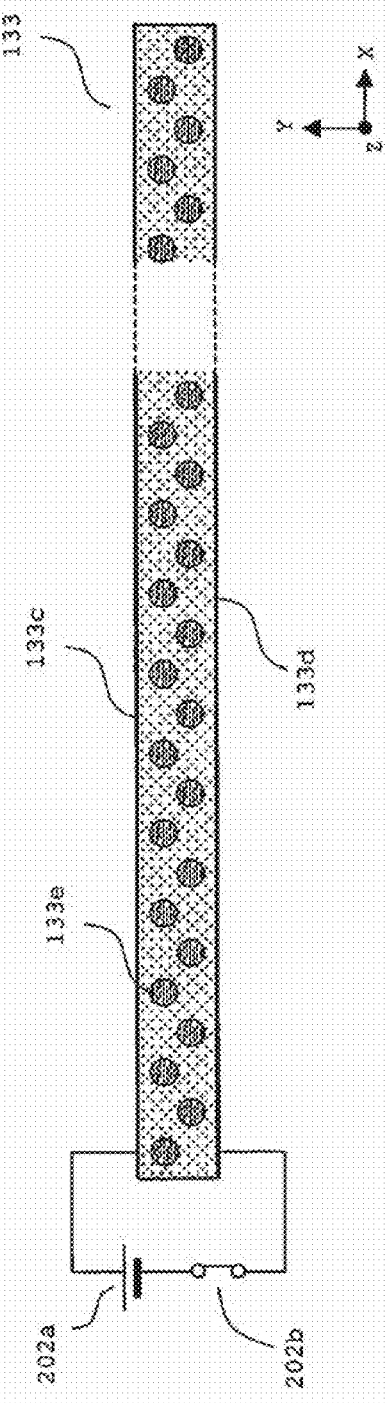

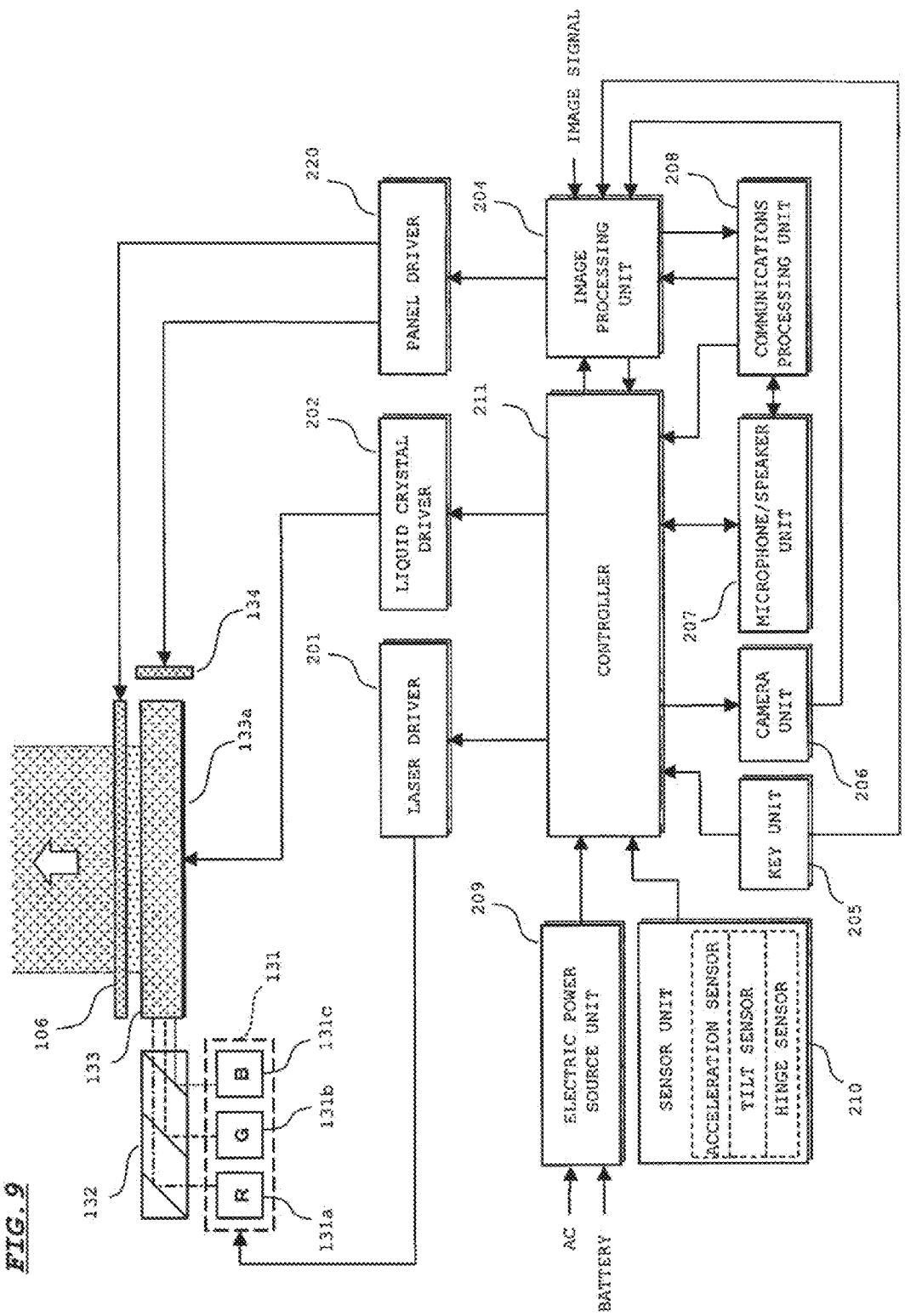

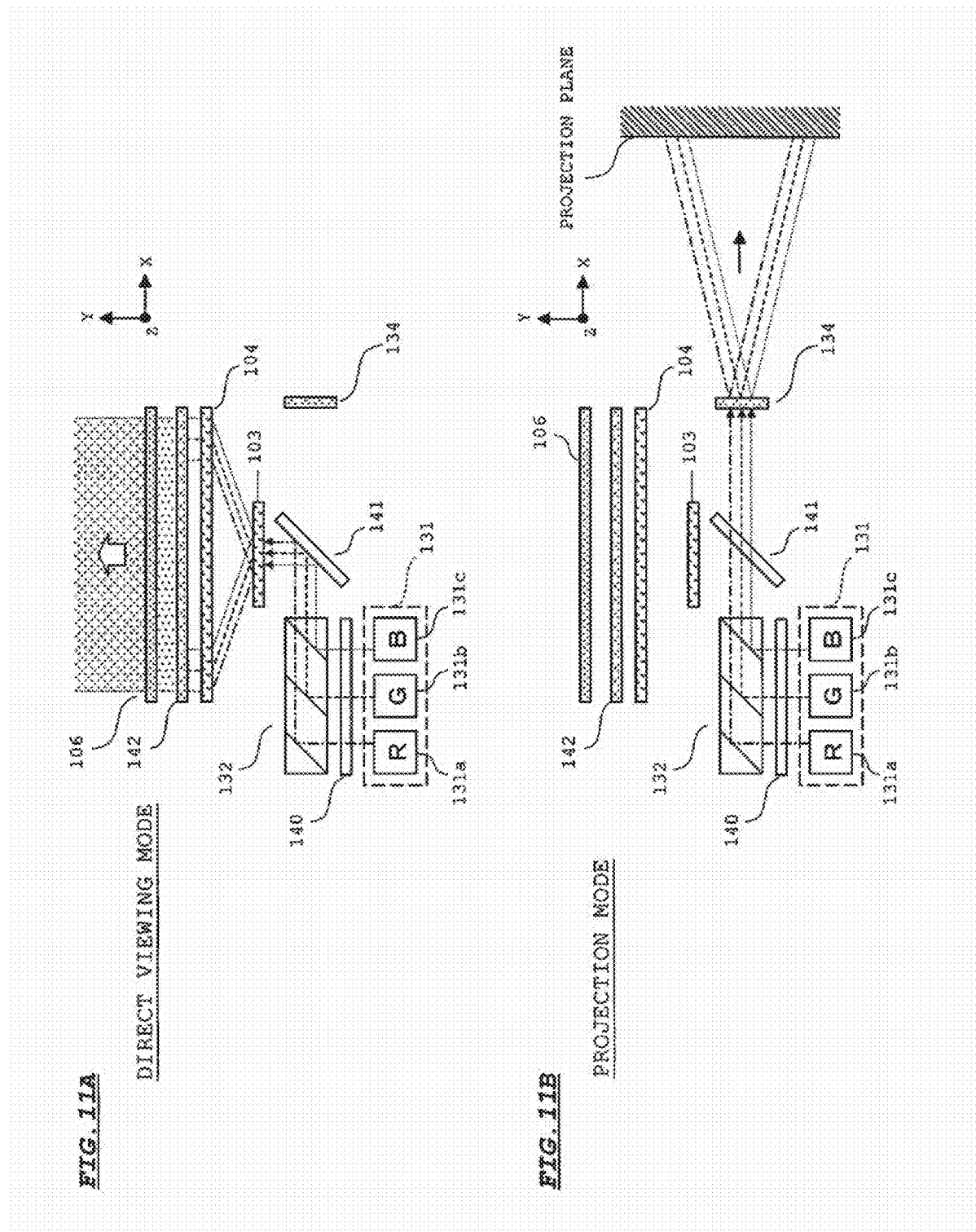

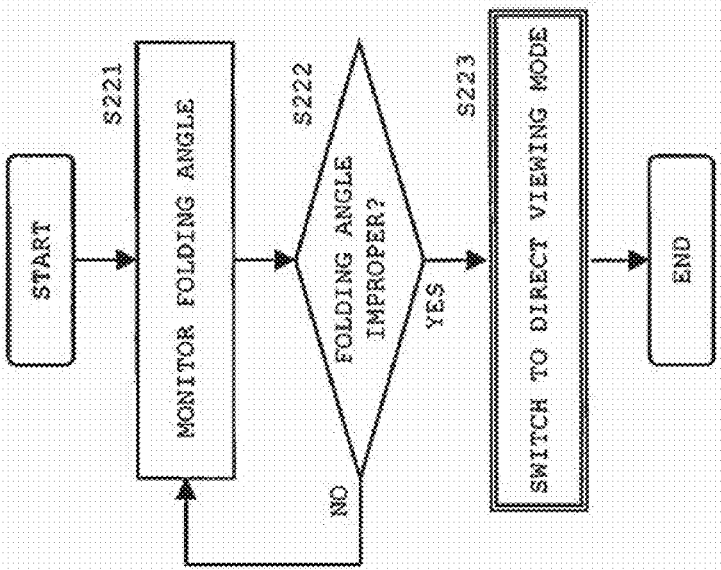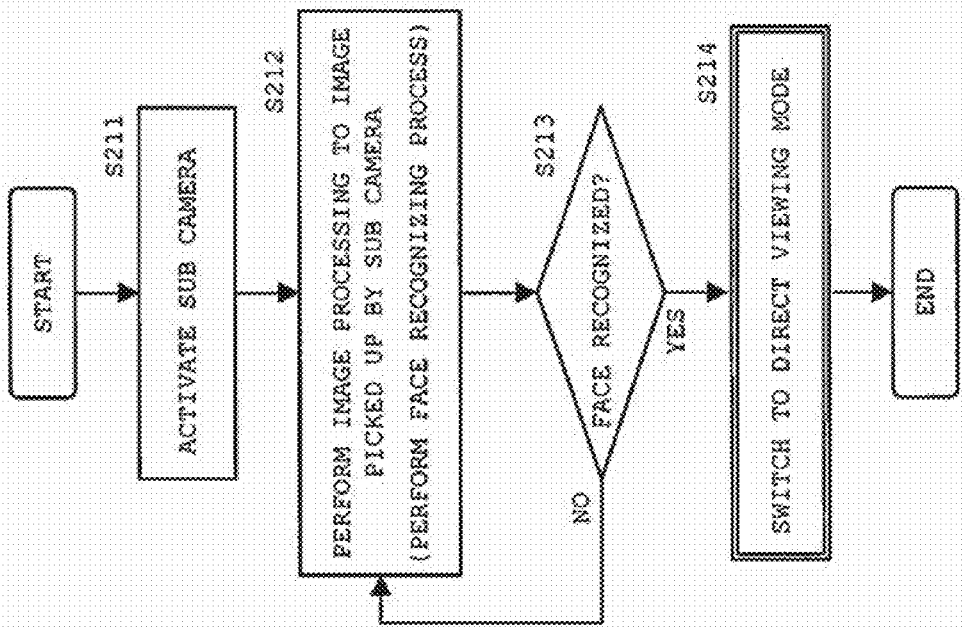

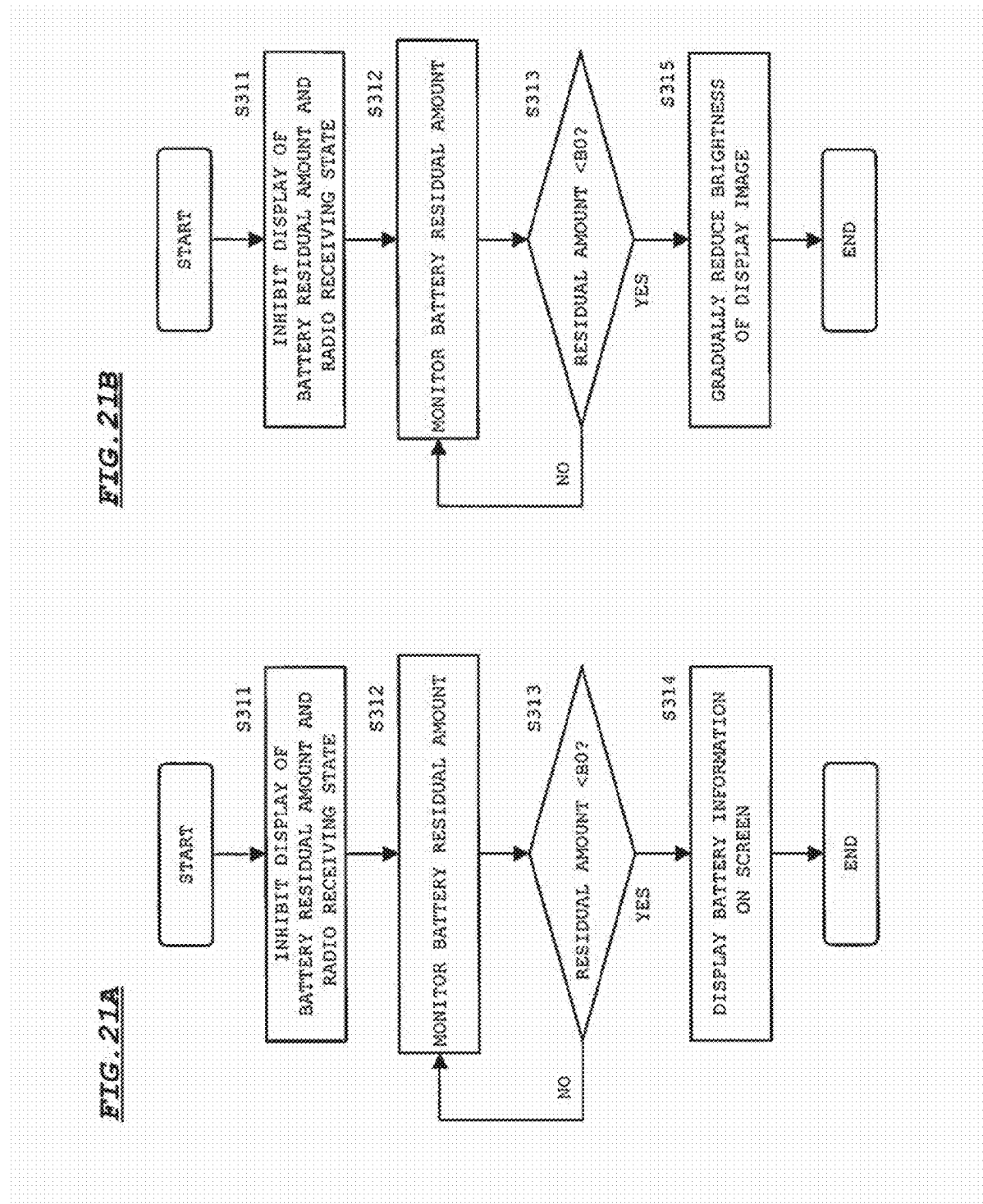

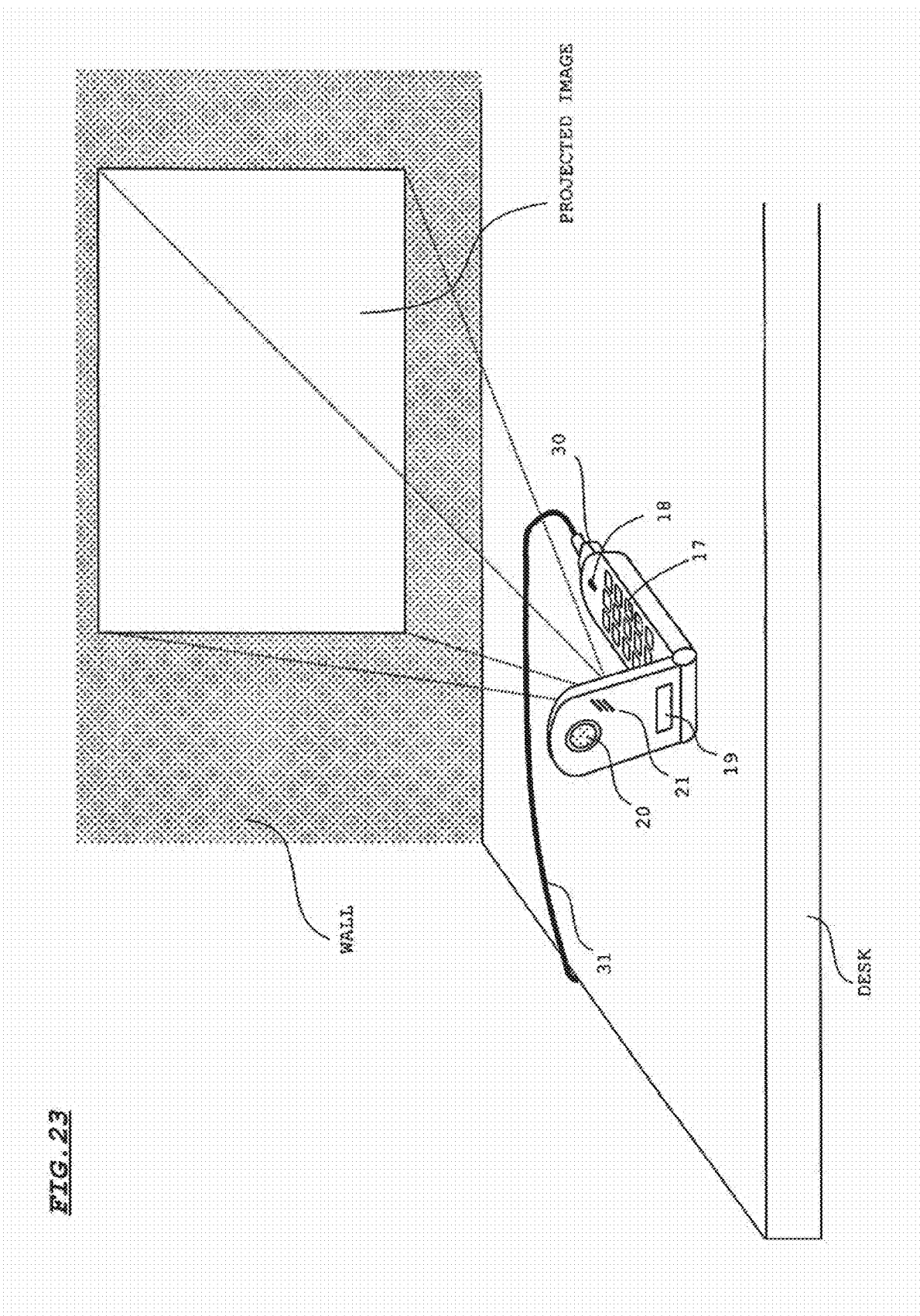

US 8,231,231 B2

IMAGE DISPLAY DEVICE AND PORTABLE TERMINAL DEVICE

CROSS-REFERENCES TO RELATED APPLICATIONS

This application is a continuing application according to 37 C.F.R. 1.53(b) and (j) of the International application number PCT/JP2008/58912 filed on May 15, 2008, which in turn claims the benefit of Japanese patent applications no. 2007-133443, filed on May 18, 2007 and 2008-123529 filed on May 9, 2008, the disclosures of which applications are incorporated by reference herein.

BACKGROUND OF THE INVENTION

1. Field of the Invention

The present invention relates to image display devices and portable terminal devices, and more particularly to an image display device and a portable terminal device for displaying an image, using laser light.

2. Disclosure of Related Art

A portable terminal device such as a portable phone is provided with a display section for displaying characters, images, and the like. Generally, the display section has a liquid crystal panel, and an image is displayed on the display section by modulating light emitted from a rear side of the liquid crystal panel by the liquid crystal panel in accordance with an image signal. Specifically, light is modulated by color-separating the light from the rear side of the liquid crystal panel by a color filter with respect to each pixel, and controlling light transmission/blocking at each pixel position by a liquid crystal element. The liquid crystal element has a transparent electrode with respect to each pixel. Light transmission/blocking is controlled at each pixel position by controlling a voltage to be applied to the transparent electrodes.

In the portable terminal device having the above arrangement, an arrangement for displaying an image by a projector may be provided, in addition to the arrangement for displaying an image by the liquid crystal panel. For instance, a projector may be constituted of a laser light source, and a light transmissive member attached with an optical element (such as a diffractive optical element or a holographic optical element). This arrangement contributes to miniaturization of a projector.

However, miniaturization by the above arrangement has a limit. In the case where a projector is loaded in a portable phone, for instance, the size of the portable phone may be increased by a space corresponding to the size of the projector.

SUMMARY OF THE INVENTION

An image display device according to a first aspect of the present invention includes a light source which emits laser light; an optical element which is operable to switch between a first state for reducing a coherence of the laser light and a second state for substantially maintaining the coherence of the laser light; a switching control circuit which controls the optical element; an imager which modulates the laser light transmitted through the optical element; and a modulation control circuit which controls the imager based on an image signal. The modulation control circuit causes the imager to render an image pattern for generating an image by changing a light amount at each pixel position when the optical element is in the first state, and causes the imager to render a hologram pattern for generating an image by diffraction when the optical element is in the second state.

An image display device according to a second aspect of the present invention includes a light source which emits laser light; an optical element which is operable to switch between a first state for diffusing the laser light and a second state for transmitting the laser light; a switching control circuit which controls the optical element; an imager which modulates the laser light transmitted through the optical element; and a modulation control circuit which controls the imager based on an image signal. The switching control circuit sets the optical element to the first state when the imager displays an image in a direct viewing mode, and sets the optical element to the second state when the imager displays the image in a projection mode.

A portable terminal device according to a third aspect of the present invention is mounted with the image display device according to the first aspect or the second aspect.

According to the present invention, a user is allowed to select between two viewing modes i.e. a mode of directly viewing a display section, and a mode (projector function) of projecting laser light. In the above arrangement, all or almost all the elements of an optical system from a laser light source to an imager are used in common to realize the two viewing modes.

BRIEF DESCRIPTION OF THE DRAWINGS

These and other objects, and novel features of the present invention will become more apparent upon reading the following detailed description of the embodiment along with the accompanying drawings.

FIGS. 3A and 3B are diagrams showing an arrangement of a Polymer Dispersed Liquid Crystal in Example 1.

FIGS. 4A and 4B are diagrams for describing an operation of an optical system in Example 1.

FIGS. 5A and 5B are diagrams for describing a modification of the optical system in Example 1.

FIG. 6 is a diagram for describing a modification of the optical system in Example 1.

FIGS. 7A and 7B are diagrams showing an arrangement of an optical system in Example 2 of the present invention.

FIGS. 8A and 8B are diagrams showing an arrangement of a Polymer Dispersed Liquid Crystal in Example 2.

FIG. 9 is a diagram showing an arrangement of a portable phone in Example 2.

FIGS. 11A and 11B are diagrams showing an arrangement of an optical system in Example 3 of the present invention.

FIGS. 19A and 19B are flowcharts showing a modification of the control processes to be performed during execution of the projection mode in the embodiment of the present invention.

FIGS. 21A and 21B are flowcharts showing processes of displaying a battery residual amount and a radio receiving state in the embodiment of the present invention.

FIG. 23 is a diagram showing a state, in which the portable phone in the embodiment of the present invention is used in a TV conference system.

Figure 1:
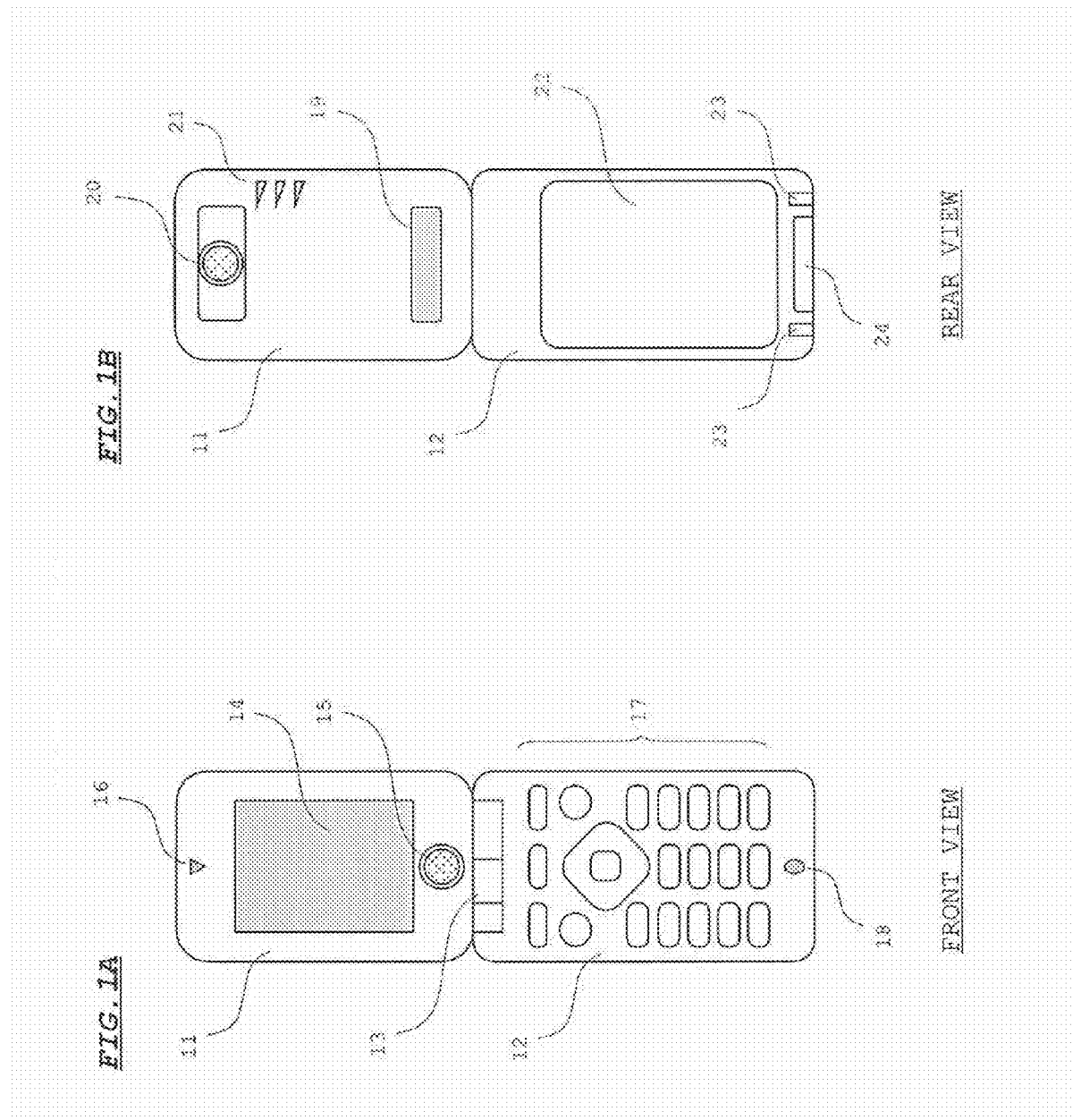
FIGS. 1A and 1B are diagrams showing an external appearance of a portable phone in Example 1 of the present invention.

The drawings are provided mainly for describing the present invention, and do not limit the scope of the present invention.

DESCRIPTION OF PREFERRED EMBODIMENTS

In the following, an embodiment of the present invention is described referring to the drawings. The embodiment is directed to an arrangement, wherein the present invention is applied to a portable phone.

Example 1

FIGS. 1A and 1B are diagrams showing an external arrangement of a portable phone in Example 1. As shown in FIGS. 1A and 1B, the portable phone includes an upper casing 11, a lower casing 12, and a hinge section 13 for pivotally mounting the upper casing 11 on the lower casing 12. The upper casing 11 has, on a front surface thereof, a main display section 14, a sub camera 15, and a communications speaker 16; and the lower casing 12 has, on a front surface thereof, a key operating section 17 and a microphone 18. Further, the upper casing 11 has, on a rear surface thereof, a sub display section 19, a main camera 20, and an external speaker 21; and the lower casing 12 has, on a rear surface thereof, a battery storing section 22, an electric power supply terminal 23, and a plug connecting section 24 to be connected with a power supply plug.

Figure 2:
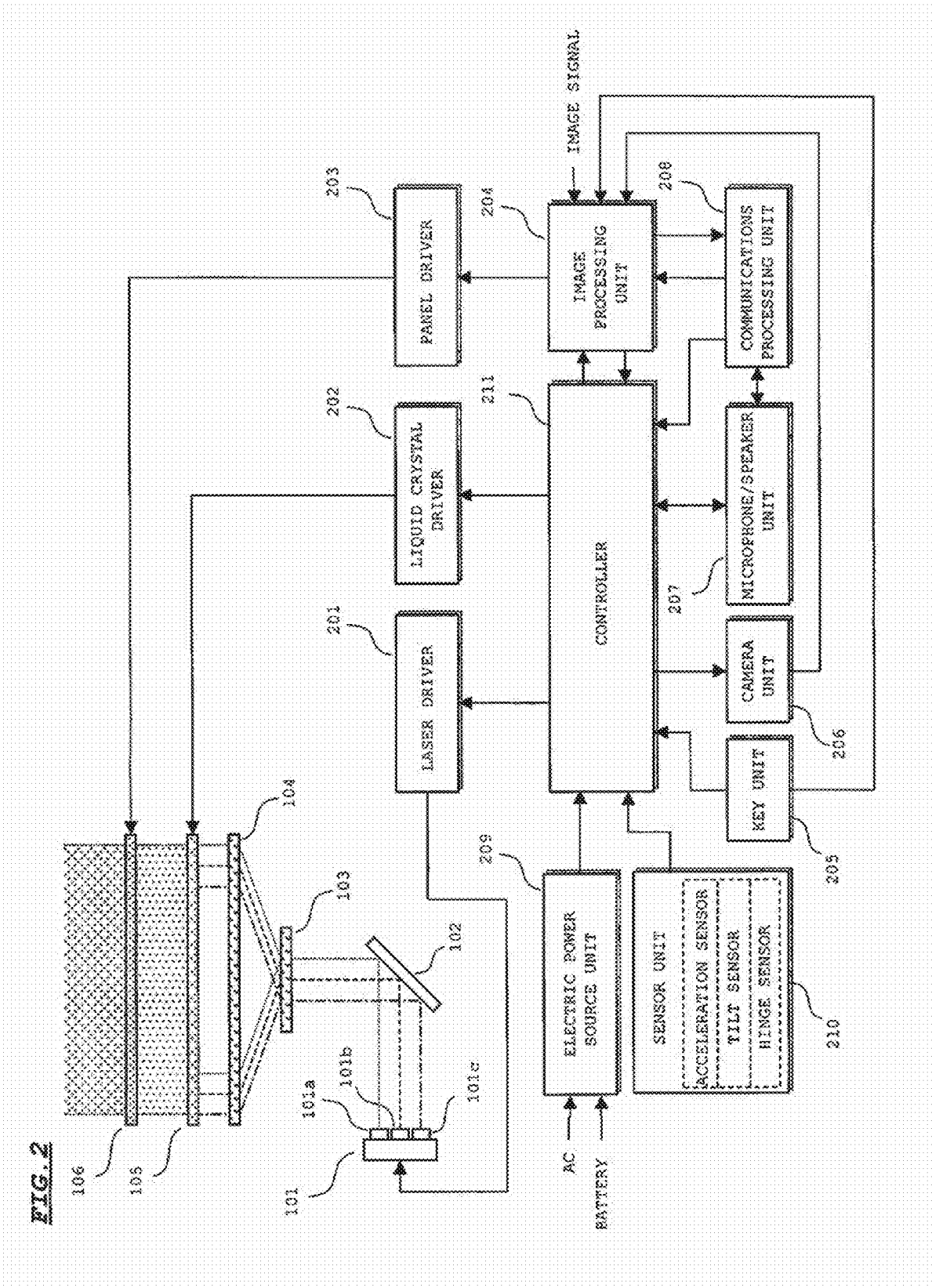
FIG. 2 is a diagram showing an arrangement of the portable phone in Example 1.

FIG. 2 is a diagram showing an optical system and a circuit configuration of the portable phone. As shown in FIG. 2, the optical system includes a laser light source 101, a mirror 102, diffraction lenses 103 and 104, a Polymer Dispersed Liquid Crystal (hereinafter, called as "PDLC") 105, and a liquid crystal panel 106. Light transmitted through the liquid crystal panel 106 is emitted from the main display section 14 shown in FIG. 1.

The laser light source 101 is constructed by mounting three laser elements 101a, 101b, and 101c respectively adapted to emit laser light in a red wavelength band (hereinafter, called as "R light"), laser light in a green wavelength band (hereinafter, called as "G light"), and laser light in a blue wavelength band (hereinafter, called as "B light"), on a substrate. The R light, the G light, and the B light emitted from the laser elements 101a, 101b, and 101c are reflected by the mirror 102, and entered into the diffraction lens 103.

The diffraction lenses 103 and 104 are so configured as to exhibit a function of a beam expander. The R light, the G light, and the B light entered into the diffraction lens 103 are converted into parallel light whose beam diameters are expanded while being transmitted through the diffraction lenses 103 and 104, and then, entered into the PDLC 105.

FIGS. 3A and 3B are diagrams showing an arrangement of the PDLC 105. The PDLC 105 is constructed by encapsulating capsules 105b, each of which is encapsulated with liquid crystal molecules, and a special polymer 105a between transparent electrodes 105c and 105d disposed opposite to each other. The liquid crystal molecules encapsulated in the capsules 105b are randomly oriented in a state that a voltage is not applied between the transparent electrodes 105c and 105d (see FIG. 3A). In this state, light entered into the PDLC 105 is scattered by the liquid crystal molecules. Light scattering by the PDLC 105 reduces the coherence of R light, G light, and B light emitted from the laser light source 101.

On the other hand, when a voltage is applied between the transparent electrodes 105c and 105d, as shown in FIG. 3B, the orientations of the liquid crystal molecules are aligned, and accordingly, light entered into the PDLC 105 propagates without being scattered by the liquid crystal molecules. Light transmitted through the PDLC 105 without being scattered by the PDLC 105 can be guided to the liquid crystal panel 106 in a state that the coherence of R light, G light, and B light emitted from the laser light source 101 is maintained. In this condition, it is desirable to guide, to the liquid crystal panel 106, light having such a coherence as to generate an image by diffraction, using a hologram pattern to be described later.

Application/non-application of a voltage to the transparent electrodes 105c and 105d is controlled by a liquid crystal driver 202 shown in FIG. 2.

Referring back to FIG. 2, the liquid crystal panel 106 has a color filter for color-separating incident light with respect to each pixel, a liquid crystal into which light subjected to color separation is entered, and transparent electrodes for applying a voltage to the liquid crystal at each pixel position. The liquid crystal panel 106 imparts a modulation function or a diffraction function to laser light transmitted through the PDLC 105 in accordance with a drive control from a panel driver 203.

When the PDLC 105 is in a state shown in FIG. 3A, similarly to image display to be performed by an existing portable phone, an image pattern for generating an image by light transmission/blocking at each pixel position (hereinafter, called as a "normal image pattern") is rendered on the liquid crystal panel 106. On the other hand, in the case where the PDLC 105 is in a state shown in FIG. 3B, a hologram pattern for generating an image by diffracting entered laser light (hereinafter, called as a "holographic image pattern") is rendered on the liquid crystal panel 106. An image is displayed by projecting the laser light diffracted by the holographic image pattern onto a desk surface, a wall surface, or a like surface.

It is desirable to set the resolution of the liquid crystal panel 106 to such a value that a hologram is renderable with a smaller pitch (preferably, a pitch in the micron order). For instance, a hologram is renderable with a pitch in the micron order by using an existing micro display panel as the liquid crystal panel 106.

The circuit system of the portable phone includes a laser driver 201, the liquid crystal driver 202, the panel driver 203, an image processing unit 204, a key unit 205, a camera unit 206, a microphone/speaker unit 207, a communications processing unit 208, an electric power source unit 209, a sensor unit 210, and a controller 211.

The laser driver 201 drives the laser light source 101 in accordance with a control from the controller 211.

The liquid crystal driver 202 drives the PDLC 105 in accordance with a control from the controller 211. Specifically, when the portable phone is in a state that an image is displayed, with the user being allowed to directly view the main display section 14 (hereinafter, called as "direct viewing mode"), a voltage is not applied between the transparent electrodes 105c and 105d (see FIG. 3A); and when the portable phone is in a state that an image is displayed with laser light being projected onto a desk surface, a wall surface, or the like (hereinafter, called as "projection mode"), a predetermined voltage is applied between the transparent electrodes 105c and 105d (see FIG. 3B).

The panel driver 203 renders a predetermined pattern on the liquid crystal panel 106 in accordance with a drive signal from the image processing unit 204. Specifically, when the portable phone is in the direct viewing mode, a normal image pattern in accordance with an image signal is rendered on the liquid crystal panel 106, and when the portable phone in the projection mode, a holographic image pattern in accordance with an image signal is rendered on the liquid crystal panel 106.

The image processing unit 204 processes e.g. an image signal inputted from an external device, characters/image data (e.g. data received by an electronic mail) to be inputted through the communications processing unit 208, image data to be inputted through the camera unit 206, and character data to be inputted through the key unit 205, generates a drive signal corresponding to a pattern to be rendered on the liquid crystal panel 106, and supplies the generated drive signal to the panel driver 203.

In this example, upon receiving a command signal indicating whether the display mode is the direct viewing mode or the projection mode, the image processing unit 204 generates a drive signal in accordance with the command signal, and supplies the drive signal to the panel driver 203. Specifically, when the portable phone is in the direct viewing mode, a drive signal corresponding to a normal image pattern is supplied to the panel driver 203, and when the portable phone is in the projection mode, a drive signal corresponding to a holographic image pattern is supplied to the panel driver 203.

The image processing unit 204 supplies, to the panel driver 203, a drive signal for displaying a radio receiving state, a battery residual amount, and a predetermined formatted screen in accordance with a command from the controller 211.

The image processing unit 204 further includes a routine for processing picked up image information to be supplied from the camera 206 for face recognition. In the case where a face image is detected in a picked-up image, a signal indicating the detection is supplied to the controller 211.

The key unit 205 has the key operating section 17 shown in FIG. 1A, and supplies a signal in accordance with a key operation to the controller 211 and the image processing unit 204. The camera unit 206 has the sub camera 15 and the main camera 20 shown in FIGS. 1A and 1B, and outputs signals indicating images picked up by the sub camera 15 and the main camera 20 to the image processing unit 204.

The microphone/speaker unit 207 has the microphone 18, the communications speaker 16, and the external speaker 21 shown in FIGS. 1A and 1B. The microphone/speaker unit 207 synthesizes an audio signal inputted through the microphone 18 during a phone call with an audio signal from a recipient of the phone call, outputs the synthesis result through the communications speaker 16; and transmits the synthesis result to the telephone of the recipient through the communications processing unit 208. Further, the microphone/speaker unit 207 outputs a predetermined formatted voice message through the communications speaker 16 and the external speaker 21 in accordance with a command from the controller 211.

The communications processing unit 208 has an antenna and a communications processing circuit, and performs a communications process with other terminal devices.

The electric power source unit 209 has the battery storing section 22, the electric power supply terminal 23, and the plug connecting section 24 shown in FIG. 1B, and supplies an electric power source to the respective parts. Further, the electric power source unit 209 supplies the controller 211 with a signal indicating whether a commercial electric power source is supplied.

The sensor unit 210 includes an acceleration sensor for detecting an acceleration of a portable phone main body, a tilt sensor for detecting a tilt state of the portable phone main body with respect to a horizontal state, and a hinge sensor for detecting a tilt angle (folding angle) of the upper casing 11 with respect to the lower casing 12. The sensor unit 210 supplies detection results by the sensors to the controller 211.

Next, an image display operation is described referring to FIGS. 4A and 4B.

When the portable phone is in the direct viewing mode shown in FIG. 4A, a voltage is not applied from the liquid crystal driver 202 to the PDLC 105, and a normal image pattern is rendered on the liquid crystal panel 106. R light, G light, and B light outputted from the laser light source 101 are reflected by the mirror 102, and the beam diameters thereof are expanded by the diffraction lenses 103 and 104. In this arrangement, since the PDLC 105 is in the state shown in FIG. 3A, the R light, the G light, and the B light are diffused on the PDLC 105, and entered into the liquid crystal panel 106. Then, the incident light is modulated according to the normal image pattern rendered on the liquid crystal panel 106 with respect to each pixel, and outputted from the main display section 14 shown in FIG. 1. The user is then allowed to see a display image by directly viewing the main display section 14.

When the portable phone is in the projection mode shown in FIG. 4B, a voltage is applied from the liquid crystal driver 202 to the PDLC 105, and a holographic image pattern is rendered on the liquid crystal panel 106. R light, G light, and B light outputted from the laser light source 101 are reflected by the mirror 102, and the beam diameters thereof are expanded by the diffraction lenses 103 and 104. In this arrangement, since the PDLC 105 is in the state shown in FIG. 3B, the R light, the G light, and the B light propagate without being diffused on the PDLC 105, and are entered into the liquid crystal panel 106. Then, the incident light is diffracted according to the holographic image pattern rendered on the liquid crystal panel 106, and outputted from the main display section 14 shown in FIG. 1A. The user is then allowed to see a display image by projecting the laser light to be emitted from the main display section 14 onto a desk surface, a wall surface, or the like.

As described above, in this example, the user is allowed to select, as necessary, one of two display modes i.e. the direct viewing mode of directly viewing the main display section 14, and the projection mode of projecting laser light onto a desk surface, a wall surface, or the like.

In this example, all the elements of the optical system from the laser light source 101 to the liquid crystal panel 106 are used in common between the two display modes. In this arrangement, there is no likelihood that the arrangement of the optical system may be complicated due to addition of a projection mode, and the size of the optical system may be increased. Thus, the example is advantageous in adding a projector function, while suppressing an increase in the size of the portable phone main body.

In this example, the beam diameter is expanded by the two diffraction lenses 103 and 104. Alternatively, the beam diameter may be expanded by using a beam expander constituted of combination of a concave lens and a convex lens. The modification, however, increases the size of a beam expander, as compared with the case in example, with the result that the size of the portable phone main body may be increased.

Further alternatively, an arrangement shown in FIGS. 5A and 5B may be employed as means for increasing a laser light incident area with respect to the liquid crystal panel 106, in place of a beam expander. Referring to FIGS. 5A and 5B, the reference numeral 111 indicates a mirror for reflecting one-third of R light, G light, and B light to be emitted from the laser light source 101, and transmitting two-thirds thereof, 112 indicates a mirror for reflecting one-half of R light, G light, and B light transmitted through the mirror 111, and transmitting one-half thereof, and 113 indicates a mirror for reflecting all of R light, G light, and B light transmitted through the mirror 112.

In the above modification example, the light amounts of R light, G light, and B light that have been reflected by the mirrors 111, 112, and 113 are made substantially equal to each other. In this arrangement, the laser light entered area with respect to the liquid crystal panel 106 is increased in X-axis direction in FIGS. 5A and 5B. In order to increase a laser light entered area in Z-axis direction in FIGS. 5A and 5B as well as X-axis direction, for instance, as shown in FIG. 6, mirror groups (mirror groups 1, 2, and 3) each constituted of mirrors 111, 112, and 113 may be aligned in three rows in Z-axis direction, and mirrors 121, 122, and 123 for equally distributing light from the laser light source 101 with respect to the mirror groups may be disposed.

In the configuration examples shown in FIGS. 4A and 4B, and FIGS. 5A and 5B, optical axes of R light, G light, and B light are displaced from each other depending on a difference in position between laser elements 101a, 101b, and 101c. In the case where the optical axis displacement affects a display image, an element for aligning the optical axes of R light, G light, and B light, such as a diffraction element, may be disposed right behind the laser light source 101.

Example 2

In Example 1, laser light is allowed to be entered into the PDLC 105 from the rear side of the liquid crystal panel. In this example, laser light is allowed to be entered into a PDLC from a lateral side of a liquid crystal panel. In Example 1, the liquid crystal panel 106 is used in common as an imager between the direct viewing mode and the projection mode. In this example, an imager for the direct viewing mode, and an imager for the projection mode are individually provided.

FIGS. 7A and 7B are diagrams showing an optical system in this example. As shown in FIGS. 7A and 7B, in this example, a light source unit 131, a dichroic prism array 132, a PDLC 133, and a liquid crystal panel 134 are provided, in addition to the liquid crystal panel 106.

The light source unit 131 has three laser light sources 131a, 131b, and 131c for emitting R light, G light, and B light, respectively. The R light, the G light, and the B light are emitted from the laser light sources 131a, 131b, and 131c in Y-axis direction. The R light emitted from the laser light source 131a is reflected in X-axis direction by a mirror surface 132a of the dichroic prism array 132, and transmitted through mirror surfaces 132b and 132c. The G light emitted from the laser light source 131b is reflected in X-axis direction by the mirror surface 132b of the dichroic prism array 132, and transmitted through the mirror surface 132c. The B light emitted from the laser light source 131c is reflected in X-axis direction by the mirror surface 132c of the dichroic prism array 132. In this way, the optical axes of R light, G light, and B light are aligned to each other, and entered into the PDLC 133 in X-axis direction.

FIG. 8A shows an arrangement of the PDLC 133. Similarly to the PDLC 105 in Example 1, the PDLC 133 is constructed by encapsulating capsules, each of which is encapsulated with liquid crystal molecules, and a special polymer. In this example, however, transparent electrodes 133b are arranged spaced apart from each other with a predetermined interval in X-axis direction. When a switch 202b shown in FIG. 8A is turned on, the plus potential and the minus potential of an electric power source 202a are respectively applied to the each adjacent two transparent electrodes 133b. Accordingly, an electric potential is applied to a portion partitioned by the transparent electrodes 133b.

Similarly to Example 1, the liquid crystal molecules encapsulated in the capsules are randomly oriented in a state that a voltage is not applied between the transparent electrodes 133b. Accordingly, light entered into the PDLC 133 is scattered by the liquid crystal molecules. On the other hand, when a voltage is applied between the transparent electrodes 133b, the orientations of the liquid crystal molecules are aligned in X-axis direction. Accordingly, incident light into the PDLC 133 propagates without being scattered by the liquid crystal molecules.

Similarly to Example 1, FIG. 8A shows the PDLC 133 having a property that the orientations of liquid crystal molecules are aligned in a voltage applying direction. Alternatively, for instance, in the case where the orientations of liquid crystal molecules are aligned in a direction perpendicular to the voltage applying direction, as shown in FIG. 8B, transparent electrodes 133c and 133d may be disposed at such a position as to interpose a layer of liquid crystal molecules 133e therebetween in Y-axis direction.

In the direct viewing mode shown in FIG. 7A, a voltage is not applied to the PDLC 133. In this case, since the orientations of liquid crystal molecules are random, R light, G light, and B light entered into the PDLC 133 are scattered by the liquid crystal molecules. A part of the scattered R light, G light, and B light is irradiated toward the liquid crystal panel 106 through an upper surface of the PDLC 133; and a part thereof is reflected by a mirror surface 133a formed on a lower surface of the PDLC 133, and then irradiated toward the liquid crystal panel 106 through the upper surface of the PDLC 133. Thus, similarly to Example 1, in the direct viewing mode shown in FIG. 7A, R light, G light, and B light emitted from the light source unit 131 are guided to the liquid crystal panel 106 as backlight.

In the projection mode shown in FIG. 7B, a voltage is applied to the PDLC 133. In this case, since the orientations of liquid crystal molecules are aligned in X-axis direction, R light, G light, and B light entered into the PDLC 133 propagate and transmit through the liquid crystal panel 134 without being scattered by the liquid crystal molecules. The transmitted R light, G light, and B light are entered into the liquid crystal panel 134 disposed at the exit side of the PDLC 133. The resolution of the liquid crystal panel 134 is set to such a value that a hologram is renderable with a pitch in the micron order. For instance, an existing micro display panel is used as the liquid crystal panel 134.

A hologram pattern (a holographic image pattern) for generating an image by diffracting entered R light, G light, and B light is rendered on the liquid crystal panel 134. An image is displayed by projecting R light, G light, and B light subjected to diffraction according to a holographic image pattern onto a projection plane (such as a desk surface or a wall surface). A projection opening through which R light, G light, and B light are projected is formed in a top portion of an upper casing 11 of a portable phone. An image is projected onto the projection plane by placing the portable phone on a desk or the like in a state that the back surface of a lower casing 12 is contacted with the desk surface or the like, and pivotally rotating the upper casing 11 to such a position as to direct the projection opening toward the projection plane.

FIG. 9 is a diagram showing a circuit configuration for driving and controlling the optical system in this example. Elements having the same arrangement as those described in Example 1 referring to FIG. 2 are indicated with the same reference numerals, and description thereof is omitted herein.

In FIG. 9, similarly to Example 1, a laser driver 201 drives a laser light source 101 in accordance with a control from a controller 211. A liquid crystal driver 202 drives the PDLC 133 in accordance with a control from the controller 211. Specifically, when the portable phone is in the direct viewing mode, a voltage is not applied between the transparent electrodes 133b, and when the portable phone is in the projection mode, a predetermined voltage is applied between the transparent electrodes 133b.

A panel driver 220 renders a predetermined pattern on the liquid crystal panel 106 and the liquid crystal panel 134 in accordance with a drive signal from an image processing unit 204. Specifically, when the portable phone is in the direct viewing mode, a normal image pattern in accordance with an image signal is rendered on the liquid crystal panel 106, and when the portable phone is in the projection mode, a holographic image pattern in accordance with an image signal is rendered on the liquid crystal panel 134.

In this example, the user is allowed to select, as necessary, one of two display modes i.e. the direct viewing mode of directly viewing a main display section 14, and the projection mode of projecting laser light onto a desk surface, a wall surface, or the like. In this example, the optical system from the light source unit 131 to the liquid crystal panel 133 is used in common between the two display modes. This enables to simplify the arrangement of the optical system, and miniaturize the optical system. Thus, the example is advantageous in adding a projector function, while suppressing an increase in the size of the portable phone main body.

Further, in this example, since a liquid crystal panel having substantially the same resolution as the resolution of an existing portable phone is usable as the liquid crystal panel 106, cost reduction can be achieved, as compared with the case in Example 1. In other words, in Example 1, a high resolution liquid crystal panel is used as the liquid crystal panel 106 to render a holographic image pattern. Since the liquid crystal panel 106 has a large display area, use of the high resolution liquid crystal panel as the liquid crystal panel 106 may increase the cost. On the other hand, in this example, since a liquid crystal panel having substantially the same resolution as the resolution of an existing portable phone is usable as the liquid crystal panel 106, as compared with Example 1, the cost can be considerably reduced. Since the display area of the liquid crystal panel 134 for use in rendering a holographic image pattern is small, use of a high resolution liquid crystal panel as the liquid crystal panel 134 does not considerably increase the cost. In view of the above, as compared with Example 1, this example is advantageous in reducing the cost.

Figures 10A, 10B, 10C:
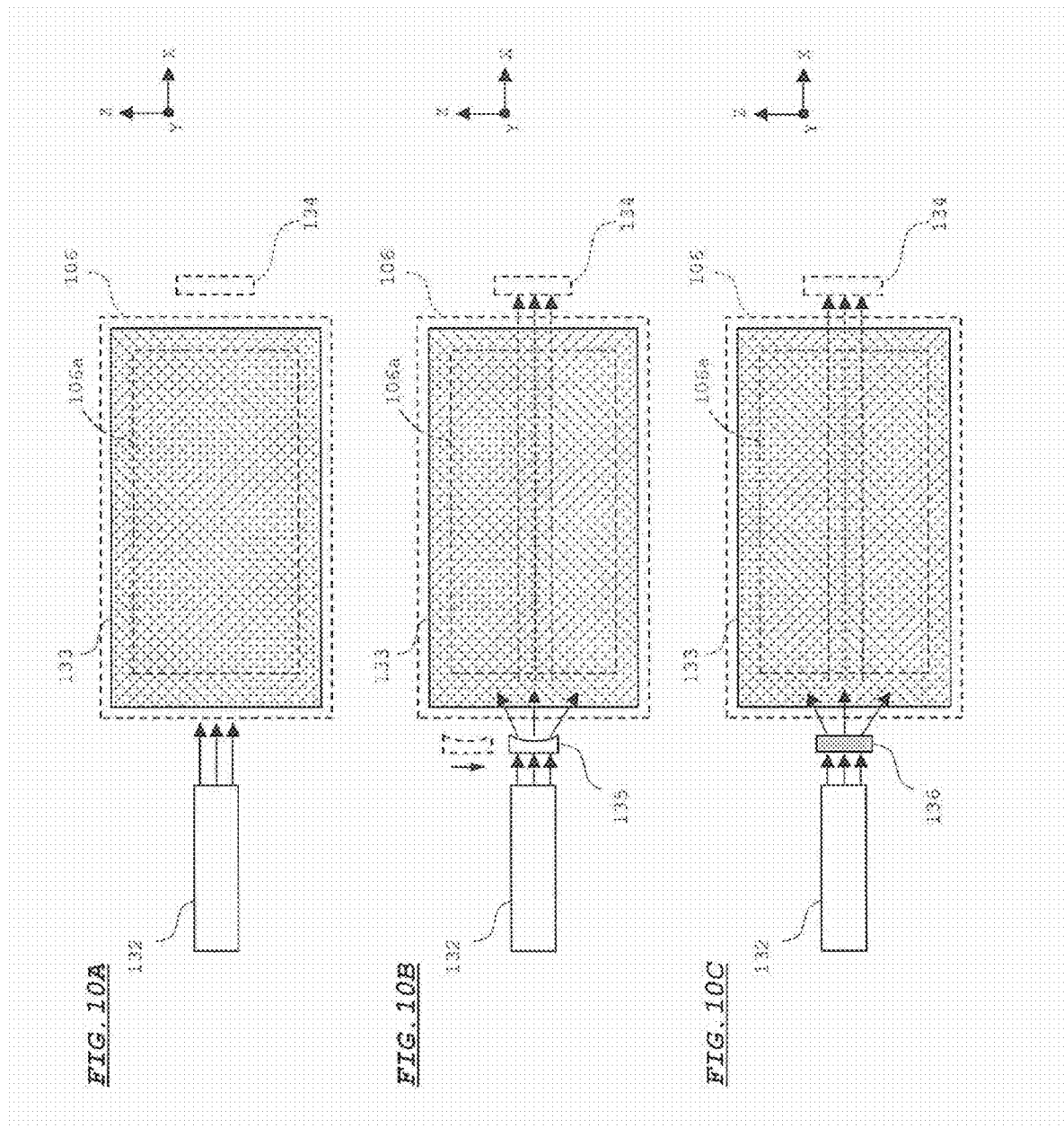
FIGS. 10A, 10B, and 10C are diagrams showing a modification of the optical system in Example 2.

In this example, as shown in FIG. 10A, laser light is allowed to be directly entered into the PDLC 133 from the dichroic prism 132. FIG. 10A is a diagram of the optical system viewed from above.

In this arrangement, in the case where laser light is not expanded within the PDLC 133 in such a manner as to cover the display area of the liquid crystal panel 106, for instance, as shown in FIG. 10B, an arrangement for inserting or retracting a lens 135 for expanding laser light in X-Z plane direction on or from the optical path of laser light may be provided. In the modification, when the portable phone is in the direct viewing mode, the lens 135 is inserted on the optical path of laser light, whereby the laser light is expanded in X-Z plane direction. When the portable phone is in the projection mode, the lens is retracted from the optical path of laser light, whereby the laser light is entered into the PDLC 133 without being expanded in X-Z plane direction. In this modification, the initial position of the lens 135 is set to such a position that the lens 135 is inserted on the optical path of laser light. In the modification, since the lens 135 is inserted on the optical path of laser light when the electric power source of the portable phone is activated, it is less likely that laser light having a high coherence may reach the liquid crystal panel 134 for diffraction, thereby enhancing safe use of the portable phone.

Alternatively, an active lens element of exhibiting a lens function in accordance with a drive signal, such as a liquid crystal lens, may be used in place of the lens 135. FIG. 10C is a diagram showing the configuration example of the modification. In this example, an active lens element 136 is disposed in place of the lens 135. The active lens element 136 is controlled to be turned on and off in accordance with a drive signal to control the propagating direction of laser light. When the portable phone is in the direct viewing mode, laser light is expanded in X-Z plane direction by the active lens element 136. When the portable phone is in the projection mode, laser light propagates through the active lens element 136 without being expanded in X-Z plane direction, and is entered into the PDLC 133. In the modification, the active lens element 136 is so configured as to exhibit a lens function in an off-state (a state that a drive signal is not applied). Thus, laser light is expanded e.g. when the electric power source is activated. Accordingly, it is less likely that laser light having a high coherence may reach the liquid crystal panel 134 for diffraction, thereby enhancing safe use of the portable phone.

Example 3

In Example 2, the PDLC 133 is operable to switch between the direct viewing mode and the projection mode. In this example, the direct viewing mode and the projection mode are switched by combination of a polarized light rotator and a polarized beam splitter.

FIGS. 11A and 11B show an optical system in Example 3. Elements in Example 3 substantially identical or equivalent to those in Examples 1 and 2 are indicated with the same reference numerals, and description thereof is omitted herein.

In this example, similarly to Example 2, a light source unit 131 and a dichroic prism 132 are provided for irradiating R light, G light, and B light. Further, similarly to Example 1, diffraction lenses 103 and 104 are provided for expanding the beam diameters of R light, G light, and B light. Furthermore, a liquid crystal panel 134 is provided for rendering a holographic image pattern in the projection mode. A diffuser 142 is also provided for diffusing R light, G light, and B light transmitted through the diffraction lens 104.

In addition to the above, in this example, a polarized light rotator 140 and a polarized beam splitter 141 are provided. The polarized light rotator 140 changes polarization directions of R light, G light, and B light in accordance with a drive signal. An example of the polarized light rotator 140 is a liquid crystal panel such as a TN liquid crystal.

When the portable phone is in the direct viewing mode as shown in FIG. 11A, the polarized light rotator 140 is kept in an off-state (a state that a drive signal is not applied). In this state, R light, G light, and B light are entered into the polarized beam splitter 141 as S-polarized light, and reflected by the polarized beam splitter 141. Thereafter, the R light, the G light, and the B light have the beam diameters thereof expanded by the diffraction lenses 103 and 104, and then diffused on the diffuser 142. Thus, when the portable phone is in the direct viewing mode, similarly to Example 1, R light, G light, and B light emitted from the light source unit 131 are guided to a liquid crystal panel 106 as backlight.

When the portable phone is in the projection mode as shown in FIG. 11B, the polarized light rotator 140 is kept in an on-state (a state that a drive signal is applied). In this state, R light, G, light and B light are entered into the polarized beam splitter 141 as P-polarized light, and transmitted through the polarized beam splitter 141. The transmitted R light, G light, and B light are entered into the liquid crystal panel 134. Similarly to Example 2, the resolution of the liquid crystal panel 134 is set to such a value that a hologram is renderable with a pitch in the micron order. For instance, an existing micro display device is used as the liquid crystal panel 134.

A hologram pattern (a holographic image pattern) for generating an image by diffracting the entered R light, G light, and B light is rendered on the liquid crystal panel 134. An image is displayed by projecting R light, G light, and B light subjected to diffraction according to a holographic image pattern onto a projection plane (such as a desk surface or a wall surface). Similarly to Example 2, a projection opening through which R light, G light, and B light are projected is formed in a top portion of an upper casing 11 of the portable phone. Placing the portable phone on a desk or the like, and pivotally rotating the upper casing 11 to such a position as to direct the projection opening toward the projection plane enables to project an image onto the projection plane.

Figure 12:
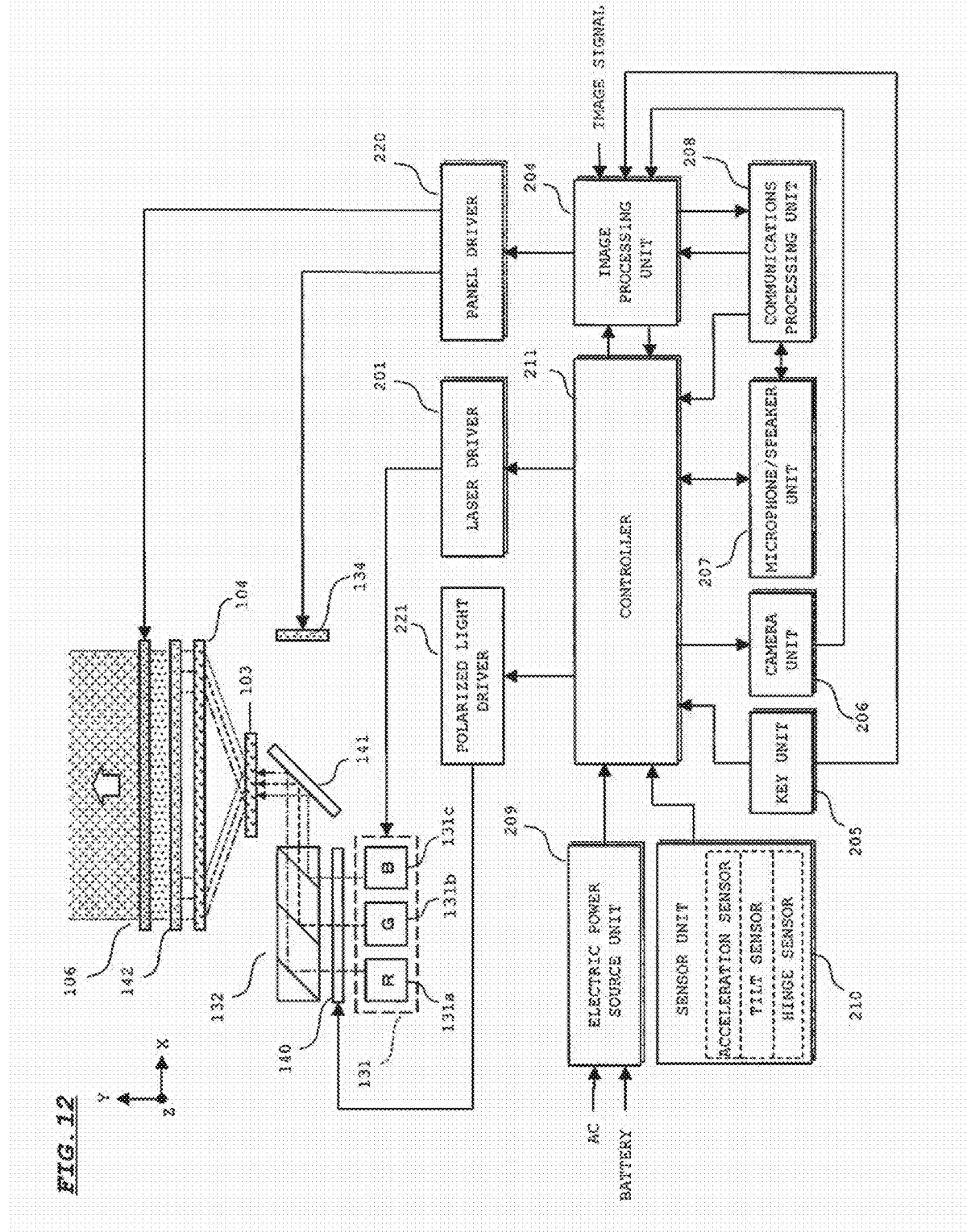
FIG. 12 is a diagram showing an arrangement of a portable phone in Example 3.

FIG. 12 is a diagram showing a circuit configuration for driving and controlling the optical system in this example. Elements having the same arrangement as those described in Examples 1 and 2 referring to FIGS. 2 and 9 are indicated with the same reference numerals, and description thereof is omitted herein.

In FIG. 12, a polarized light driver 221 drives the polarized light rotator 140 in accordance with a control from a controller 211. Specifically, the polarized light driver 221 sets the polarized light rotator 140 to an off-state (a state that a drive signal is not applied) when the portable phone is in the direct viewing mode, and sets the polarized light rotator 140 to an on-state (a state that a drive signal is applied) when the portable phone is in the projection mode.

Similarly to Example 2, a panel driver 220 renders a normal image pattern in accordance with an image signal on the liquid crystal panel 106 when the portable phone is in the direct viewing mode, and renders a holographic image pattern in accordance with an image signal on the liquid crystal panel 134 when the portable phone is in the projection mode.

Similarly to Examples 1 and 2, in this example, the user is allowed to select, as necessary, one of two display modes i.e. the direct viewing mode of directly viewing a main display section 14, and the projection mode of projecting laser light onto a desk surface, a wall surface, or the like. In this example, the optical system from the light source unit 131 to the polarized beam splitter 141 is used in common between the two display modes. This enables to simplify the arrangement of the optical system and miniaturize the optical system. Thus, the example is advantageous in adding a projector function, while suppressing an increase in the size of the portable phone main body. Further, in this example, since a liquid crystal panel having substantially the same resolution as the resolution of an existing portable phone is usable as the liquid crystal panel 106, similarly to Example 2, the cost can be reduced.

In this example, the polarized beam splitter 141 is used as means for changing the optical paths of R light, G light, and B light. Alternatively, a wire grid polarized light separating element may be used, in place of the polarized beam splitter 141. Use of the wire grid polarized light separating element is advantageous in reducing the weight of a portable phone.

In the case where the polarized beam splitter 141 is used, it is necessary to switch the polarization directions of R light, G light, and B light between Y-axis direction (P-polarization direction) and Z-axis direction (S-polarization direction) shown in FIG. 12. However, if a wire grid polarized light separating element is used, since transmission/reflection is determined based on a relation between the direction of grid pitch and the polarization directions of R light, G light, and B light, the polarization directions of R light, G light, and B light are not necessarily aligned with Y-axis direction (P-polarization direction) or Z-axis direction (S-polarization direction), and may be aligned with a polarization direction other than the above. Accordingly, use of a wire grid polarized light separating element is advantageous in increasing the latitude in the position of laser light sources 131*a*, 131*b*, and 131*c*, thereby increasing the design latitude of an optical system.

In this example, R light, G light, and B light are allowed to be entered into the polarized beam splitter 141 in X-axis direction. Alternatively, it is possible to allow R light, G light, and B light to be entered into the polarized beam splitter 141 in Y-axis direction. In the modification, the laser light sources 131*a* through 131*c* are disposed at such positions that R light, G light, and B light are entered into the polarized beam splitter 141 as P-polarized light when the polarized light rotator 140 is in an off-state. Since the polarized light rotator 140 is kept in an off-state when the portable phone is in a normal operation state e.g. at the time of activating the electric power source of the portable phone, there is no likelihood that laser light is guided to the liquid crystal panel 134 by reflection on the polarized beam splitter 141.

Control Process by Portable Phone

In Example 1, in the case where the projection mode is selected, laser light having a high coherence is emitted from the main display section 14 to be directly viewed when the portable phone is in a normal use state. Likewise, in Examples 2 and 3, laser light having a high coherence is emitted through the projection opening formed in the top portion of the upper casing 11. In view of this, it is necessary to securely avoid likelihood that laser light may be irradiated onto a human body, in the case where the projection mode is set as a display mode.

In the following, control processes for avoiding a likelihood that laser light may be irradiated onto a human body are described process by process, referring to FIGS. 13A and 13B through FIGS. 19A and 19B. It should be noted that the direct viewing mode is always set as the display mode at the time of activating the portable phone.

Figure 13A:
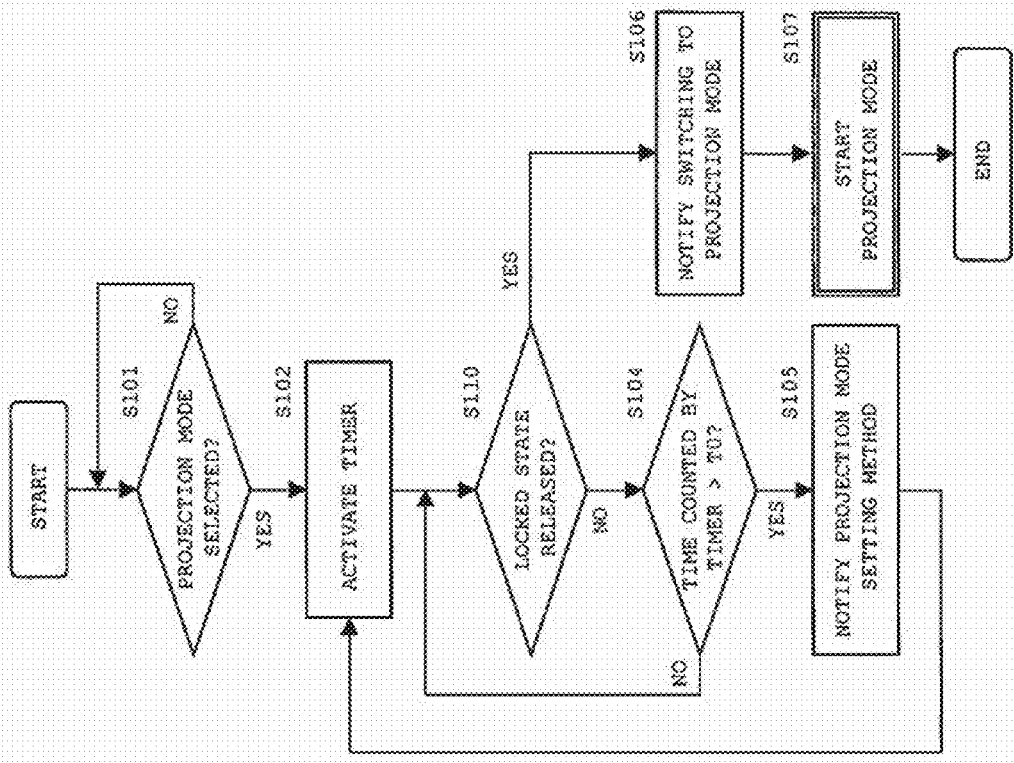
FIGS. 13A and 13B are flowcharts showing control processes to be performed at the time of setting a projection mode in an embodiment of the present invention.

FIG. 13A is a process to be performed when the projection mode is selected. Upon manipulation of the key operating section 17 and input of a command indicating selecting the projection mode (Step S101), a build-in timer is activated (Step S102), and judgment is made whether a password has been inputted (Step S103). If it is judged that a password has not been inputted within a predetermined time T0 (YES in Step S104), the user is notified that the portable phone is not allowed to switch to the projection mode, and then, a projection mode setting method is notified (Step S105). Specifically, the user is requested to input a password. The notification is executed by display on the main display section 14 and/or audio output through the external speaker 21.

If the password has not been correctly inputted upon lapse of a predetermined time after the notification, the projection mode setting is suspended.

In the case where the password has been correctly inputted within the time T0, or the password has been correctly inputted after the notification in Step S105 (YES in Step S103), the user is notified that the portable phone is switched to the projection mode (Step S106). Thereafter, the projection mode is started (Step S107). The projection mode may be started upon input of confirmation operation after the notification in Step S106 in order to obtain higher security.

Figure 13B:
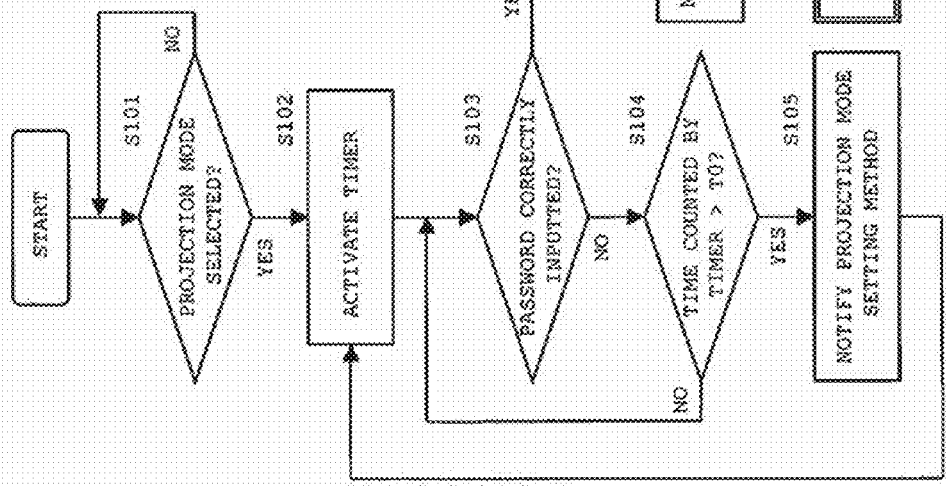

In FIG. 13B, the display mode is locked to the direct viewing mode, and the portable phone is not allowed to switch to the projection mode unless the portable phone is released from the locked state. In the control flow shown in FIG. 13B, Step S110 is provided in place of Step S103 in the control flow shown in FIG. 13A. Specifically, judgment is made as to whether a process of releasing the portable phone from the direct viewing mode has been properly performed, in place of judgment as to whether a password has been inputted correctly, and the process after S106 is executed, if it is judged that the process of releasing the locked state has been properly performed.

In the control processes shown in FIGS. 13A and 13B, input of a password or releasing a locked state is requested to set the projection mode, in addition to an operation input for setting the projection mode. This enables to avoid likelihood that a child or an unauthenticated person may select the projection mode. Further, since a complex procedure is necessary to switch the portable phone to the projection mode, easy selection of the projection mode is avoided.

Figure 14:
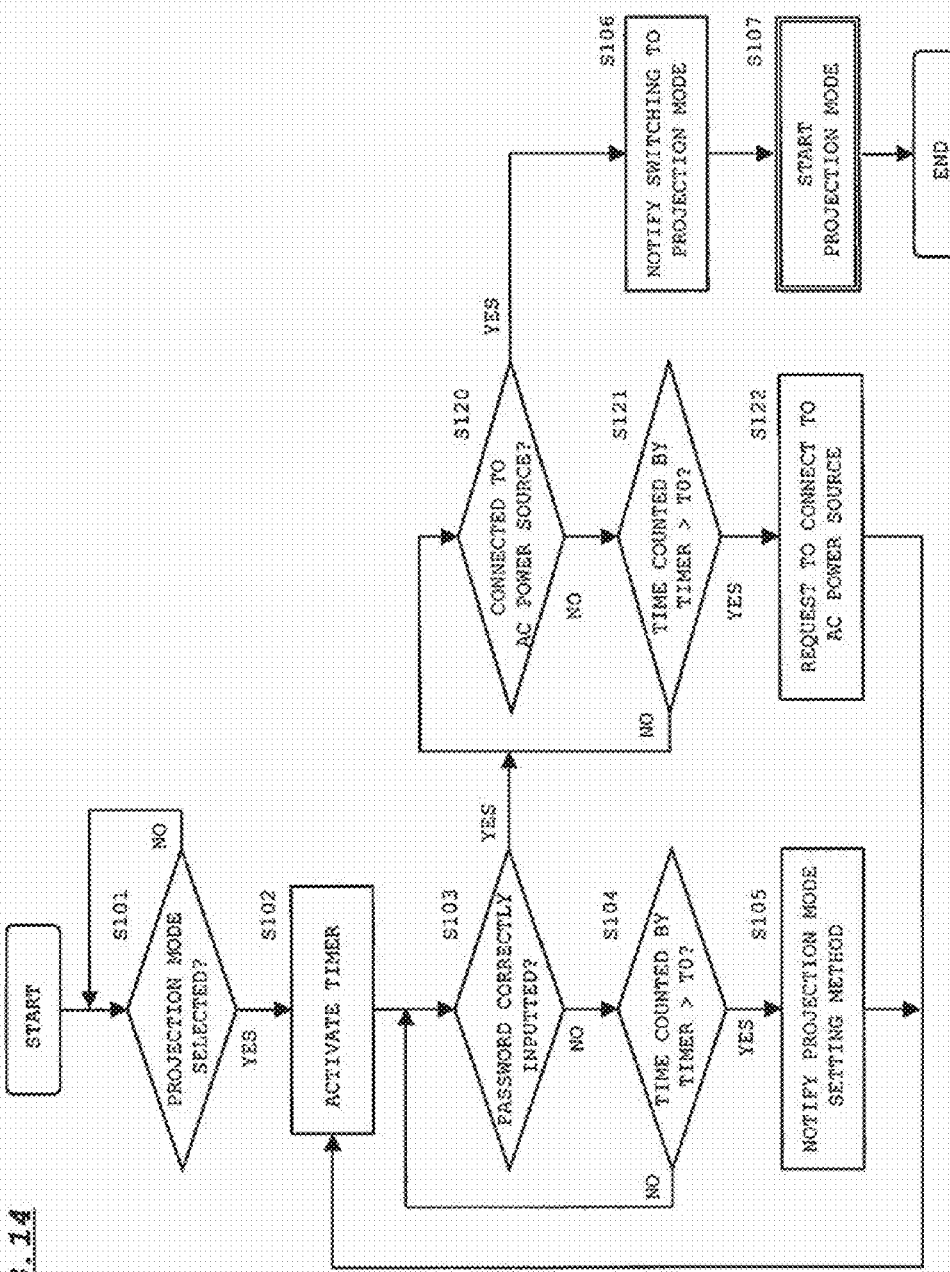
FIG. 14 is a flowchart showing a modification of the control process to be performed at the time of setting a projection mode in the embodiment of the present invention.

In the control process shown in FIG. 14, judgment is made whether an AC electric power source (a commercial electric power source) has been connected to the portable phone, in addition to the judgment process shown in FIG. 13A, and the projection mode is set if it is judged that the AC electric power source has been connected. In FIG. 14, process steps S120 through S122 are added to the process flow shown in FIG. 13A. Specifically, even if it is judged that the password has been properly inputted in Step S103, it is judged whether an AC electric power source has been connected to the portable phone in Step S120.

Judgment as to whether an AC electric power source has been connected to the portable phone is made by judging whether a signal indicating connection to an AC electric power source has been inputted from the electric power source unit 209 to the controller 211 shown in FIGS. 2, 9, and 12.

If connection to an AC electric power source has not been detected within the predetermined time T0 (YES in Step S121), the user is notified that the portable phone is not allowed to switch to the projection mode, and then, is requested to connect to an AC electric power source (Step S122). The notification is executed by display on the main display section 14 and/or audio output through the external speaker 21.

If connection to an AC electric power source has not been detected upon lapse of a predetermined time after the notification, the projection mode setting is suspended.

In the case where connection to an AC electric power source has been detected within the time T0, or connection to an AC electric power source has been detected after the notification in Step S122 (YES in Step S120), the user is notified that the portable phone is switched to the projection mode (Step S106). Thereafter, the projection mode is started (Step S107).

Generally, in the case where an image is displayed in the projection mode, it is necessary to set the output of the laser light source 101 higher than the output in the direct viewing mode. As a result, the electric power consumption in the projection mode is increased, as compared with the electric power consumption in the direct viewing mode. Accordingly, it is preferable to use the portable phone in the projection mode by connecting the portable phone to an AC electric power source. In view of this, requesting connection to an AC electric power source, as shown in the control process of FIG. 14, is advantageous in securely avoiding wear of a battery, and allowing the user to recognize that the portable phone is switched to the projection mode.

Figure 15:
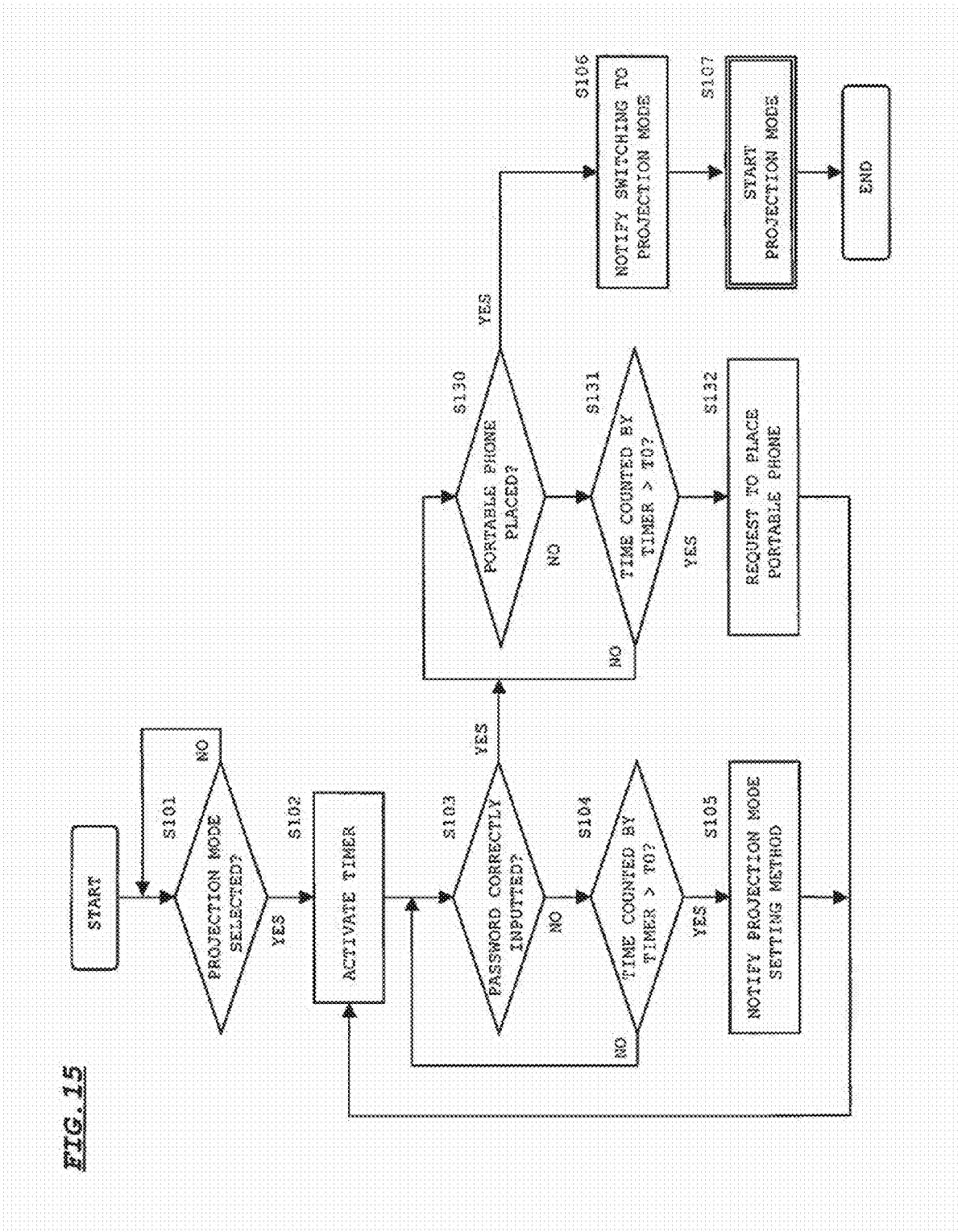
FIG. 15 is a flowchart showing a modification of the control process to be performed at the time of setting a projection mode in the embodiment of the present invention.

In the control process shown in FIG. 15, judgment is made as to whether the portable phone is placed on a desk or the like, in addition to the judgment process shown in FIG. 13A, and the projection mode is set if it is judged that the portable phone is in a placement state. In FIG. 15, process steps S130 through S132 are added to the process flow shown in FIG. 13A. Specifically, even if it is judged that the password has been properly inputted in Step S103, it is judged whether the portable phone is in a placement state in Step S130.

Judgment as to whether the portable phone is in a placement state is made based on a detection signal from the acceleration sensor to be inputted from the sensor unit 210 to the controller 211 shown in FIGS. 2, 9, and 12. In other words, if the acceleration is zero, it is judged that the portable phone is in a placement state.

If it is judged that the portable phone is not in a placement state within the predetermined time T0 (YES in Step S131), the user is notified that the portable phone is not allowed to switch to the projection mode, and then, is requested to place the portable phone (Step S132). The notification is executed by display on the main display section 14 and/or audio output through the external speaker 21.

If it is judged that the portable phone is not placed upon lapse of a predetermined time after the notification, the projection mode setting is suspended.

In the case where it is judged that the portable phone is placed within the time T0, or the portable phone is placed after the notification in Step S132 (YES in Step S130), similarly to the above, the user is notified that the portable phone is switched to the projection mode (Step S106). Thereafter, the projection mode is started (Step S107).

Generally, in the case where an image is displayed in the projection mode, the portable phone is supposed to be used, while being placed on a desk or the like. If the portable phone is switched to the projection mode, while the user holds the portable phone, laser light could be erroneously irradiated onto a person. In view of this, judging whether the portable phone has been placed, as shown in the control process of FIG. 15, is advantageous insecurely avoiding erroneous irradiation of laser light onto a person, and allowing the user to recognize that the portable phone is switched to the projection mode.

Figure 16:
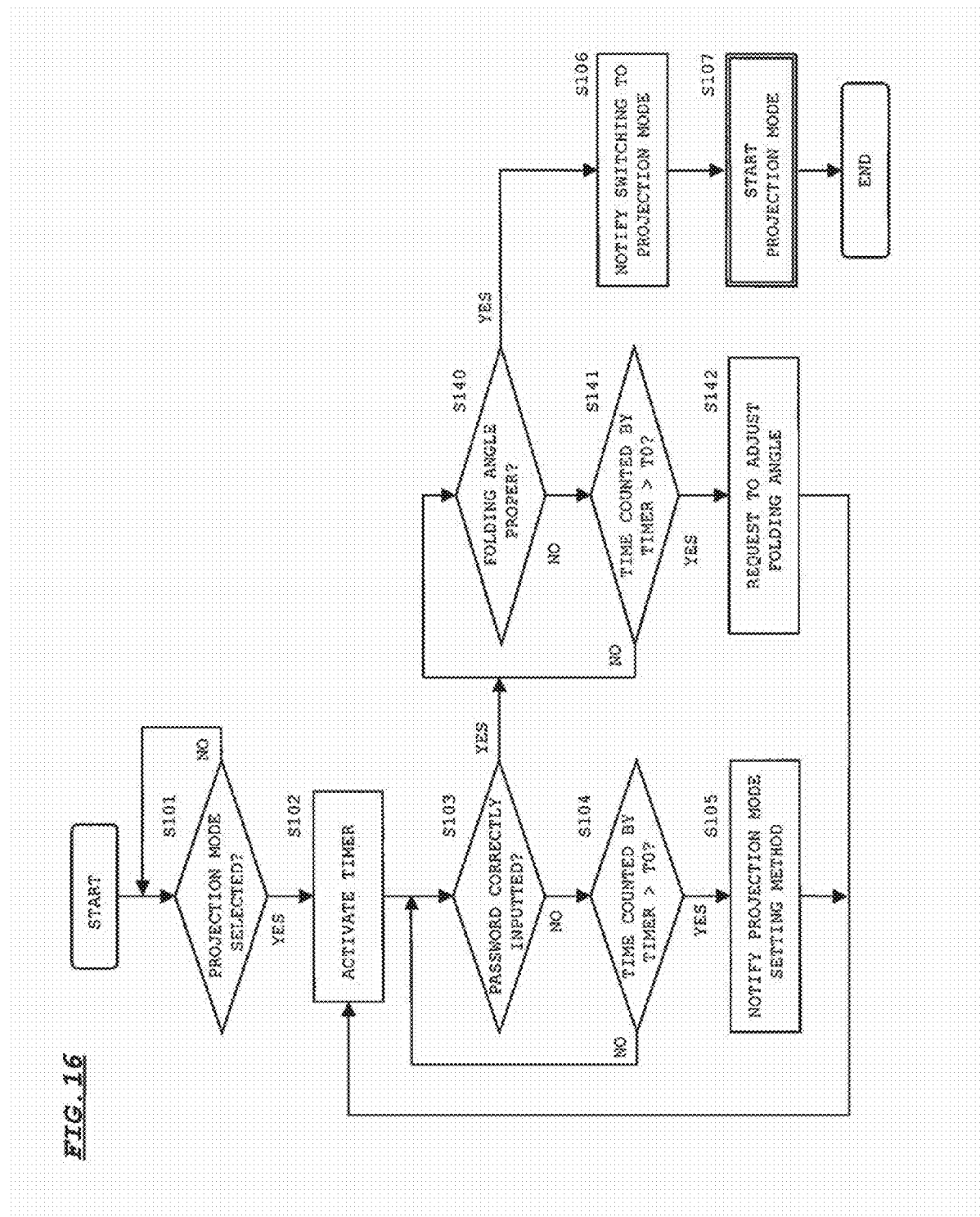
FIG. 16 is a flowchart showing a modification of the control process to be performed at the time of setting a projection mode in the embodiment of the present invention.

In the control process shown in FIG. 16, judgment is made as to whether the folding angle (the pivot angle of the upper casing 11 with respect to the lower casing 12) of the portable phone is properly set, in addition to the judgment process in FIG. 13A, and the projection mode is set if it is judged that the folding angle is properly set. In FIG. 16, process steps S140 through S142 are added to the process flow shown in FIG. 13A. Specifically, even if it is judged that the password has been properly inputted in Step S103, it is judged whether the folding angle of the portable phone is properly set in Step S140.

Judgment as to whether the folding angle is properly set is made based on a detection signal from the hinge sensor to be inputted from the sensor unit 210 to the controller 211 shown in FIGS. 2, 9, and 12.

If it is judged that the folding angle of the portable phone is not properly set within the predetermined time T0 (YES in Step S141), the user is notified that the portable phone is not allowed to switch to the projection mode, and then, is requested to adjust the folding angle of the portable phone (Step S142). The notification is executed by display on the main display section 14 and/or audio output through the external speaker 21.

If it is judged that the folding angle is not properly set upon lapse of a predetermined time after the notification, the projection mode setting is suspended.

In the case where it is judged that the folding angle is properly set within the time T0, or the folding angle is properly set after the notification in Step S142 (YES in Step S140), similarly to the above, the user is notified that the portable phone is switched to the projection mode (Step S106). Thereafter, the projection mode is started (Step S107).

Generally, in the case where an image is displayed in the projection mode, the portable phone is placed on a desk or the like, and is used, with the folding angle thereof being adjusted in a predetermined range. In the arrangement of Example 1, if the portable phone is switched to the projection mode in a state that the upper casing 11 of the portable phone is fully opened or nearly fully opened, a laser light irradiation direction is directed upwardly, resulting in that laser light could be erroneously irradiated onto a person. Further, in the arrangement of Example 1, if the upper casing 11 of the portable phone is opened with an undesirable angle, laser light could be erroneously irradiated onto a person. In view of this, additionally judging whether the folding angle of the portable phone is properly set, as shown in the control process of FIG. 16, is advantageous in securely avoiding erroneous irradiation of laser light onto a person, and allowing the user to recognize that the portable phone is switched to the projection mode.

Figure 17:
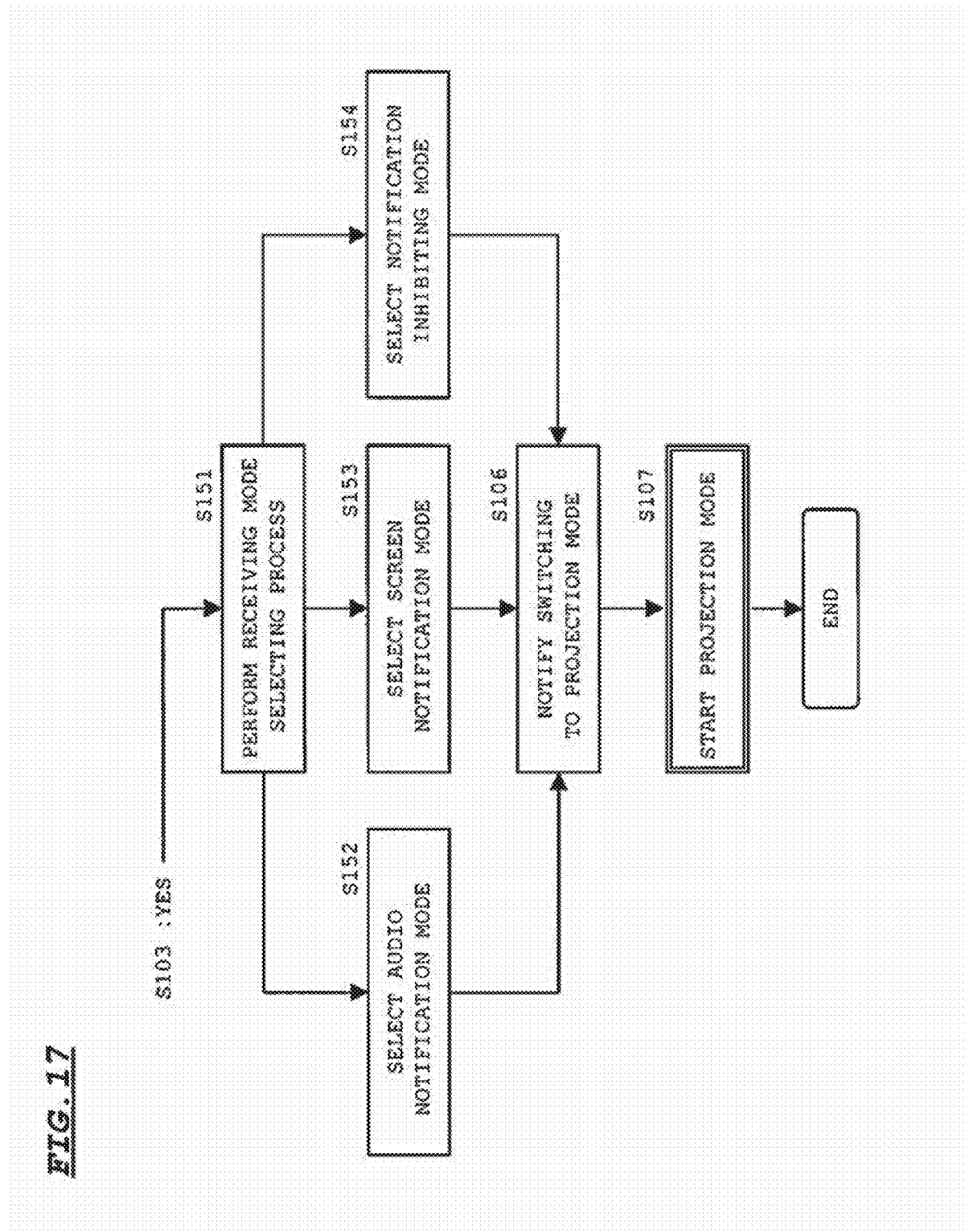
FIG. 17 is a flowchart showing a process of setting a receiving mode in the embodiment of the present invention.

FIG. 17 is a flowchart showing a process flow to be performed in selecting and setting a notification to a user that the portable phone has received a phone call or an electronic mail from another terminal device during execution of the projection mode.

If a ring tone for notifying receiving of a phone call or an electronic mail is outputted during execution of the projection mode, a person may inadvertently pick up the portable phone or approach the portable phone, resulting in that laser light could be erroneously irradiated onto the person. In order to avoid the likelihood, it is desirable to turn off a ring tone, or superimposedly display a message notifying that the portable phone has received a phone call or an electronic mail on a projection screen during execution of the projection mode.

In the process flow shown in FIG. 17, if it is judged that a password has been properly inputted in Step S103 shown in FIG. 13A, the routine proceeds to a process of selecting a receiving mode during execution of the projection mode (Step S151). In this embodiment, three notification modes i.e. an audio notification mode (Step S152), a screen notification mode (Step S153), and a notification inhibiting mode (Step S154) are presented to the user as options.

The audio notification mode is a mode of notifying receiving a phone call or an electronic mail by way of a ring tone. The screen notification mode is a mode of notifying receiving a phone call or an electronic mail by superimposedly displaying characters or the like indicating the receiving on a display screen. In the screen notification mode, notification of receiving by way of audio sounds is not performed. The notification inhibiting mode is a mode of inhibiting notification of receiving a phone call and an electronic mail.

If an intended mode is selected from among the three receiving modes, receiving notification is performed in accordance with the selected mode during execution of the projection mode. Thereafter, similarly to the above, the user is notified that the portable phone is switched to the projection mode (Step S106). Thereafter, the projection mode is started (Step S107).

Next, a control process for preventing erroneous irradiation of laser light in advance, in view of likelihood that laser light could be directed to a person during execution of the projection mode, is described referring to FIGS. 18A, 18B, 19A, and 19B.

Figure 18B:
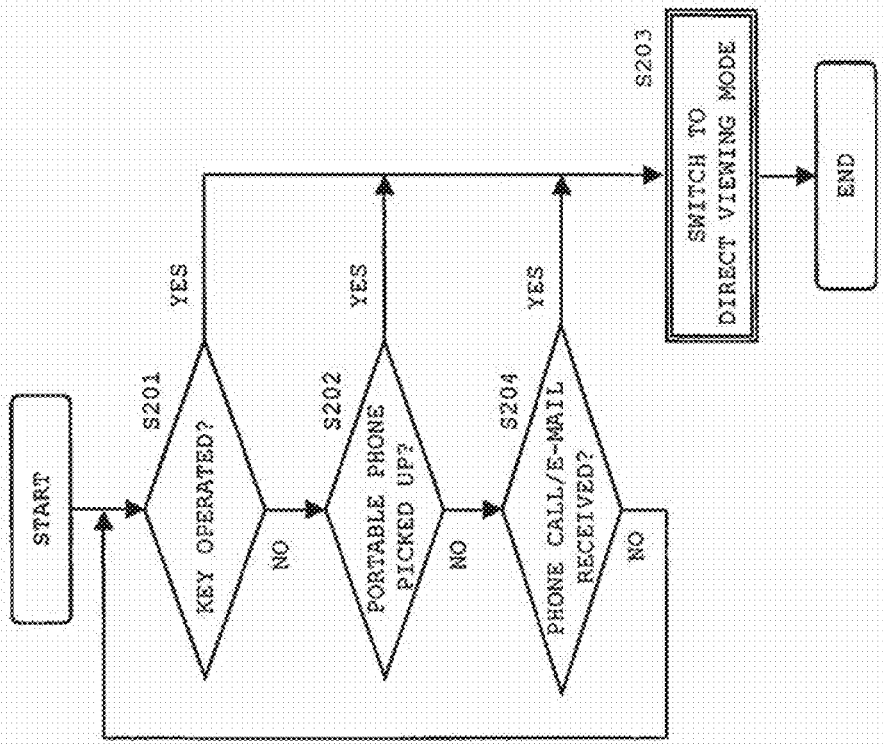
FIGS. 18A and 18B are flowcharts showing control processes to be performed during execution of the projection mode in the embodiment of the present invention.
Figure 18A:
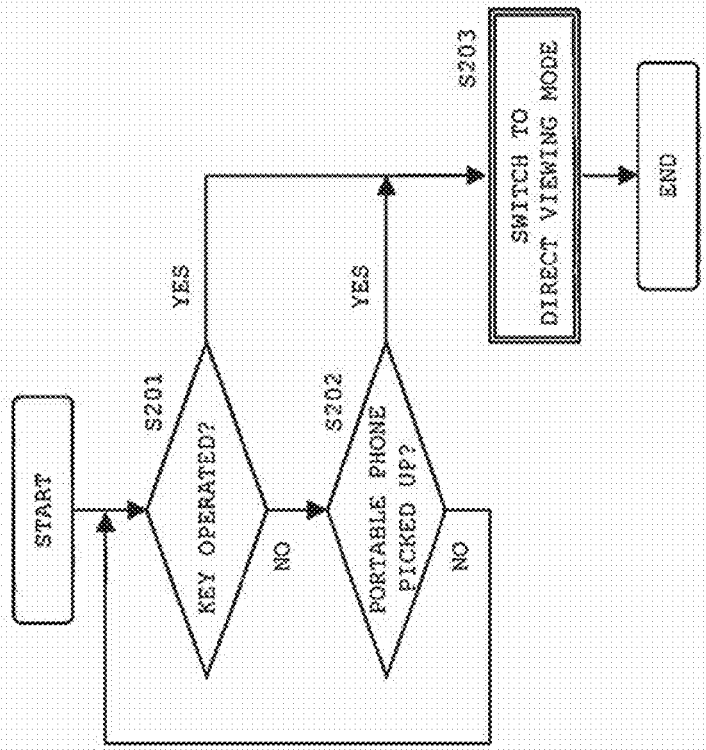

In FIG. 18A, if it is judged that any one of operation buttons in the key operating section 17 has been operated (YES in Step S201), or if it is judged that the portable phone has been picked up (YES in Step S202) during execution of the projection mode, the projection mode is suspended, and the display mode is switched to the direct viewing mode (Step S203). In this example, judgment as to whether the portable phone has been picked up is made based on a detection signal from the acceleration sensor to be inputted from the sensor unit 210 to the controller 211 shown in FIGS. 2, 9, and 12. Specifically, if the acceleration speed is over a predetermined threshold value, it is judged that the portable phone has been picked up.

In FIG. 18B, judgment as to whether a phone call/electronic mail has been received is made (Step S204) in addition to the judgment process shown in FIG. 18A. Adding the judgment step S204 prevents likelihood that a person might inadvertently pick up the portable phone or approach the portable phone in response to a ring tone indicating receiving a phone call or an electronic mail, resulting in that laser light could be erroneously irradiated onto the person.

In FIG. 19A, the sub camera 15 attached to the same surface as the main display section 14 is activated during execution of the projection mode (Step S211), and an image picked up by the sub camera 15 is subjected to image processing by the image processing unit 204. The image processing unit 204 performs a face recognizing process based on the picked up image (Step S212). If a face of a person is detected in the picked up image (YES in Step S213), the image processing unit 204 transmits a signal indicating the detection to the controller 211. Then, the controller 211 suspends the projection mode and switches the display mode to the direct viewing mode in response to receiving the face detection signal from the image processing unit 204 (Step S214).

In this example, a face recognizing process is performed based on a picked up image from the sub camera 15, and judgment is made as to whether a face has approached the main display section 14. Alternatively, in place of or in addition to the above, a person recognition may be made based on a picked up image from the sub camera 15, and the display mode is switched to the direct viewing mode, based on a judgment that a person has approached the main display section 14 at a position closer than a threshold distance. Further alternatively, a face recognition and a person recognition may be performed, using an image picked up by the main camera 20 disposed on the rear surface of the portable phone, in addition to an image picked up by the sub camera 15 to judge whether a face and a person has approached. In the arrangements of Examples 2 and 3, since the projection opening is formed in the top portion of the upper casing 11, projection may be performed in a state that the upper casing 11 is half-opened. In this case, photographing the exterior of the portable phone by the sub camera 15 is difficult. Therefore, in the above usage state, a person and/or a face is recognized based on an image picked up by the main camera 20.

In FIG. 19B, a folding angle of the portable phone is monitored, based on a signal from the sensor unit 210 (the hinge sensor) during execution of the projection mode (Step S221). If it is judged that the folding angle is improperly set (YES in Step S222), the controller 211 suspends the projection mode and switches the display mode to the direct viewing mode (Step S223).

As described above, there is likelihood that laser light may be erroneously irradiated onto a person e.g. when the laser light irradiation direction is directed upwardly, in a state that the upper casing 11 of the portable phone is opened with an undesirable angle. In view of this, erroneous irradiation of laser light can be prevented by suspending the projection mode in response to a detection that the folding angle of the portable phone is improperly set during execution of the projection mode, as shown in the control process in FIG. 19B.

Figure 20C:
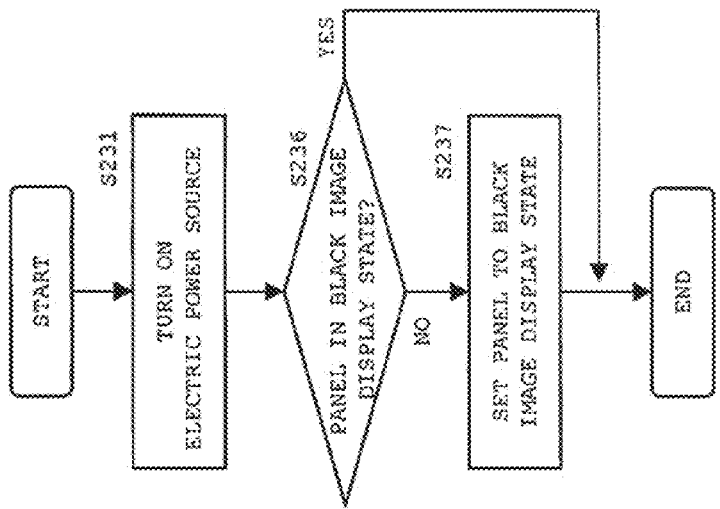
FIGS. 20A, 20B, and 20C are flowcharts showing control processes to be performed at the time of activating the portable phone in the embodiment of the present invention.
Figure 20B:
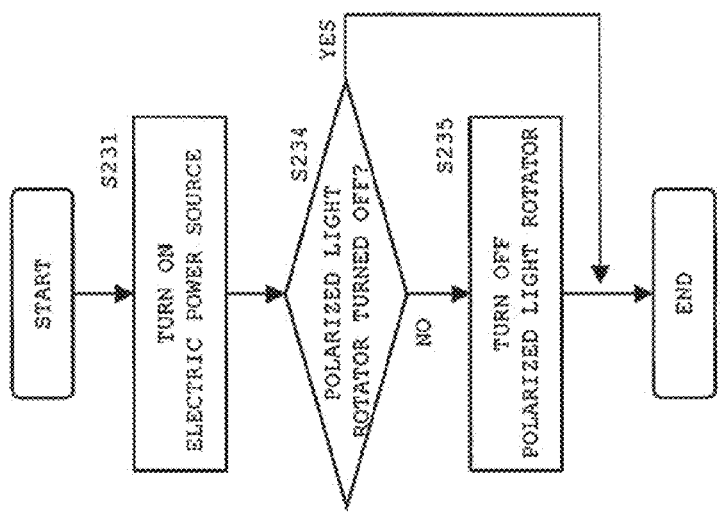
Figure 20A:
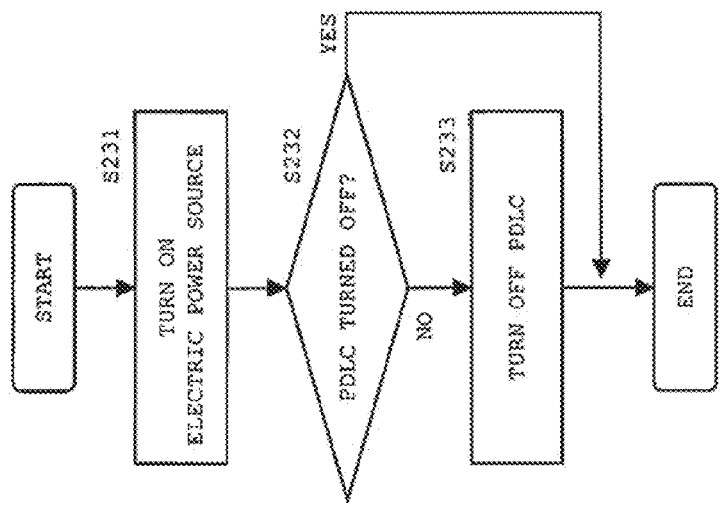

FIGS. 20A, 20B, and 20C are process flows to be executed at the time of activating the portable phone.

FIG. 20A corresponds to the arrangements in Examples 1 and 2. When the electric power source of the portable phone is turned on (Step S231), it is judged whether the PDLCs 105 and 133 are in an off-state (Step S232). If it is judged that the PDLCs 105 and 133 are not in an off-state (NO in Step S232), the PDLCs 105 and 133 are turned off (Step S233). Thereafter, the portable phone is activated.

FIG. 20B corresponds to the arrangement in Example 3. When the electric power source of the portable phone is turned on (Step S231), it is judged whether the polarized light rotator 140 is in an off-state (Step S234). If it is judged that the polarized light rotator 140 is not in an off-state (NO in Step S234), the polarized light rotator 140 is turned off (Step S235). Thereafter, the portable phone is activated.

According to the processes shown in FIGS. 20A and 20B, at the time of activating the portable phone, the PDLCs 105 and 130 are always set to an off-state. Further, since the polarized light rotator 140 is set to an off-state, there is no likelihood that laser light having a high coherence might be erroneously emitted to the exterior of the portable phone, after the portable phone is activated.

FIG. 20C corresponds to the arrangements in Examples 2 and 3. When the electric power source of the portable phone is turned on (Step S231), it is judged whether the liquid crystal panel 134 to be used in rendering a diffraction pattern is in a black image display state (Step S236). If it is judged that the liquid crystal panel 134 is not in a black image display state (NO in Step S236), the liquid crystal panel 134 is set to a black image display state (Step S237). Thereafter, the portable phone is activated.

According to the process shown in FIG. 20C, at the time of activating the portable phone, the liquid crystal panel 134 is always set to a black image display state. In the case laser light should be transmitted through the PDLC 133 or the polarized beam splitter 141, the laser light is blocked by the liquid crystal panel 134. Thus, this arrangement enables to prevent likelihood that laser light having a high coherence might be erroneously emitted to the exterior of the portable phone, after the portable phone is activated.

Next, an inherent process to be performed at the time of setting the projection mode is described.

FIGS. 21A and 21B are diagrams relating to display of a battery residual amount and a radio receiving state.

Referring to FIG. 21A, when the projection mode is set, display of a battery residual amount and a radio receiving state is turned off (Step S311). During execution of the projection mode, the controller 211 monitors the battery residual amount based on battery information to be supplied from the electric power source unit 209 (Step S312). If it is judged that the monitored battery residual amount is under a threshold value B0 (YES in Step S313), the controller 211 causes the image processing unit 204 to perform a process of superimposedly displaying the battery information on a projection screen (Step S314).

In this example, the battery information is displayed by e.g. a method for displaying characters indicating that the battery residual amount is decreasing on a screen, or a method for displaying the battery residual amount in terms of a scale. Alternatively, the display may be intermittently performed at a predetermined cycle, or the display may be changed in a stepwise manner, as the battery residual amount is decreased.

In FIG. 21A, the battery information is notified by display. Alternatively, the battery information may be notified by audio sounds. Further alternatively, as shown in FIG. 21B, if it is judged that the battery residual amount is under the threshold value B0 (YES in Step S313), the brightness of a display image may be gradually reduced in accordance with the battery residual amount (Step S315). In the modification, the controller 211 supplies a signal for changing the brightness of a display image to the laser driver 201.

Figure 22B:
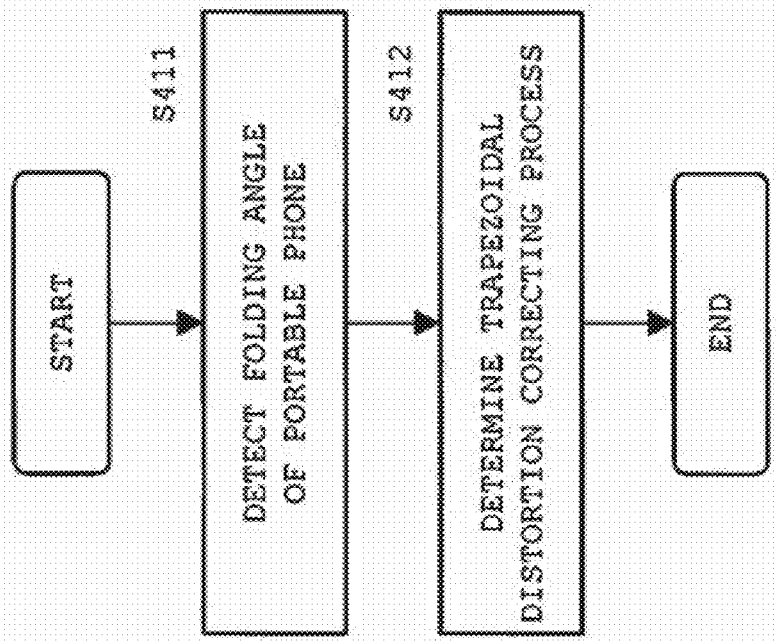
FIGS. 22A and 22B are flowcharts showing processes of rendering a holographic image pattern in the embodiment of the present invention.
Figure 22A:
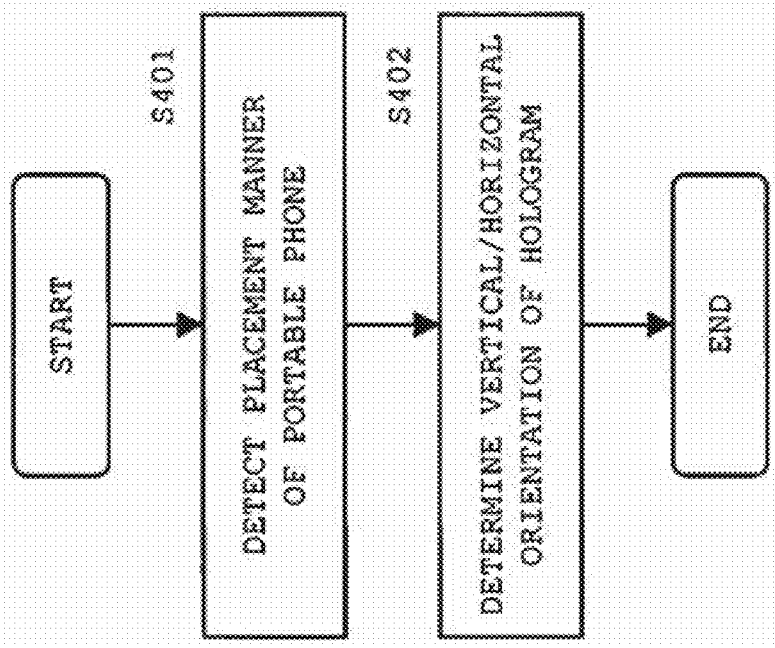

FIGS. 22A and 22B are control process flows relating to a projected image. The process flows correspond to the arrangement in Example 1.

Referring to FIG. 21A, a manner for placing a portable phone with respect to a desk surface or the like is detected (Step S401). A hologram orientation is determined depending on the placement manner (Step S402).

In the case where an image is projected, there are supposed, as a manner for placing a portable phone with respect to a desk surface or the like, a manner that the rear surface of the lower casing 12 is in plane contact with a placement plane in a state that the portable phone is folded with a predetermined angle (vertical placement manner); and a manner that the side surfaces of the upper casing 11 and the lower casing 12 are in plane contact with a placement plane in a state that the portable phone is folded with a predetermined angle (horizontal placement manner). A vertical orientation/horizontal orientation of the liquid crystal panel 106 with respect to a horizontal direction differs between the vertical placement manner and the horizontal placement manner. In view of this, it is necessary to change a rendering orientation between the vertical placement manner and the horizontal placement manner, in rendering a holographic image pattern on the liquid crystal panel 106.

Referring to FIG. 21A, it is judged whether the portable phone is vertically or horizontally placed with respect to a placement plane (Step S401). The judgment is made based on a detection signal from the tilt sensor, out of the signals to be outputted from the sensor unit 210 shown in FIG. 2. An orientation in which a holographic image pattern is rendered on the liquid crystal panel 106 is determined depending on a judgment result (vertical placement manner or horizontal placement manner) in Step S401 (Step S402). Then, a holographic image pattern is rendered on the liquid crystal panel 106 depending on the determined rendering orientation, and an image is projected onto the projection plane.

There are supposed, as the horizontal placement manner, a manner that the right side surface of the portable phone is in plane contact with a placement plane (first horizontal placement manner), and a manner that the left side surface of the portable phone is in plane contact with a placement plane (second horizontal placement manner). In view of this, it is necessary to judge whether the placement manner is the first horizontal placement manner or the second horizontal placement manner in Step S401, if it is judged that the placement manner is the horizontal placement manner; and to determine the orientation in which a holographic image pattern is rendered on the liquid crystal panel 106, based on a judgment result as to whether the horizontal placement manner is the first horizontal placement manner or the second horizontal placement manner in Step S402.

Further, it is convenient if the orientation of a display screen is changeable, as necessary. For instance, a touch sensor may be provided on the portable phone, and the orientation of a display screen may be changed by allowing the user to operate the portable phone through the touch sensor, after the projection mode is started.

FIG. 22B is a process flow for correcting a trapezoidal distortion in a projected image.

For instance, in the case where an image is projected onto a desk surface by placing the portable phone on the desk surface or the like in a vertical placement manner, a trapezoidal distortion in a projected image is changed depending on a change in the folding angle of the upper casing 11. In view of this, it is necessary to change a process of correcting a trapezoidal distortion depending on the folding angle of the upper casing 11 in the projection mode.

Referring to FIG. 22B, the folding angle of the portable phone is detected (Step S411). The detection is performed based on a signal from the hinge sensor, out of the signals to be outputted from the sensor unit 210 shown in FIG. 2. A process of correcting a trapezoidal distortion is determined, depending on a detection result in Step S411 (Step S412). Then, signal generation is performed by the image processing unit 204 in accordance with the determined correcting process, and a holographic image pattern whose trapezoidal distortion has been corrected is rendered on the liquid crystal panel 106.

FIG. 23 is a diagram showing a usage state, in the case where the portable phone as one of the examples is used in a TV conference system. For sake of convenience, FIG. 23 shows a usage state in which the portable phone having the arrangement of Example 1 is used. In the case where the portable phone having the arrangement of Example 2, 3 is used, the upper casing 11 is folded to such a position that the projection opening is directed toward a wall.

Referring to FIG. 23, the reference numeral 30 indicates a connection plug for supplying an AC electric power source to the portable phone, and 31 indicates an electric power source line. The connection plug 30 is connected to the plug connecting section 24 shown in FIG. 1. The portable phone is set to the projection mode. The user is seated on the rear side of the portable phone.

An image of the user or the like is picked up by the main camera 20, subjected to image processing by the image processing unit 204, and then transmitted to a terminal device of a recipient through the communications processing unit 208. Image information received from the recipient terminal device is transmitted to the image processing unit 204 through the communications processing unit 208, and rendered on the liquid crystal panel 106 as a holographic image pattern. Accordingly, an image of the recipient or the like image is projected on a wall surface.

The user's voice is collected by the microphone 18, and transmitted to the recipient terminal device through the communications processing unit 208. Audio information received from the recipient terminal device is transmitted to the microphone/speaker unit 207 through the communications processing unit 208, and outputted to the external speaker 21.

In this way, using the portable phone in the projection mode enables to configure a TV conference system. The embodiment is advantageous in remarkably enhancing the usability and use value of the portable phone by adding a projection mode.

Some of the examples of the present invention have been described in the foregoing section. However, the present invention is not limited to the examples. Further, the embodiment of the present invention may be changed in various ways other than the above.

For instance, the present invention is applicable to a portable terminal device other than the portable phone, such as PDA (Personal Digital Assistant). The present invention is also applicable to an installation-type display device.

In Example 1, an image is projected through the main display section 14. Alternatively, an image may be projected through the sub image section 19. In the modification, a message that the projector is set to the projection mode is displayed on the main display section 14 with in the direct viewing mode.

Further alternatively, the laser light source 101 and the light source unit 131 may be used in common for various purposes of use.

For instance, laser light to be emitted from the laser light source 101 or the light source unit 131 may be utilized as a light source for flashlight emission. In the modification, for instance, optical path separating means for guiding light from the laser light source 101 or the light source unit 131 to an optical system for flashlight emission during a photographic operation by a camera is provided, and the laser light source 101 or the light source unit 131 is activated for pulse light emission.

Further alternatively, laser light to be emitted from the laser light source 101 or the light source unit 131 may be used in common for a distance sensor. In the modification, for instance, optical path separating means for guiding light from the laser light source 101 or the light source unit 131 to an optical system for a distance sensor during a distance measuring operation is provided. Either one of the laser light source 101 and the light source unit 131 is activated for pulse light emission. Then, a distance to a targeted object is calculated, based on a time difference between a timing of pulse light emission and a timing of receiving reflection light from the targeted object.

Further alternatively, laser light to be emitted from the laser light source 101 or the light source unit 131 may be used as flashlight having various patterns.

The embodiment of the present invention may be changed or modified in various ways as necessary, as far as such changes and modifications do not depart from the scope of the claims of the present invention hereinafter defined.

What is claimed is:

1. An image display device, comprising:
a light source which emits laser light;

an optical element which is operable to switch between a first state for reducing a coherence of the laser light and a second state for substantially maintaining the coherence of the laser light;

a switching control circuit which controls the optical element;

an imager which modulates the laser light transmitted through the optical element; and a modulation control circuit which controls the imager based on an image signal, wherein the modulation control circuit causes the imager to render an image pattern for generating an image by changing a light amount at each pixel position when the optical element is in the first state, and causes the imager to render a hologram pattern for generating an image by diffraction when the optical element is in the second state.

2. The image display device according to claim 1, wherein:

the optical element guides the laser light in a first direction when the optical element is in the first state, and guides the laser light in a second direction different from the first direction when the optical element is in the second state;

the imager includes a first imager into which the laser light propagating in the first direction is entered, and a second imager into which the laser light propagating in the second direction is entered; and the modulation control circuit causes the first imager to render the image pattern when the optical element is in the first state, and causes the second imager to render the hologram pattern when the optical element is in the second state.

3. The image display device according to claim 1, wherein the optical element includes a liquid crystal element having orientations of liquid crystal molecules switched between an alignment state and a non-alignment state by controlling a voltage to be applied.

4. The image display device according to claim 1, wherein the optical element includes:

a beam splitter which transmits the laser light having a first polarization direction, and reflects the laser light having a second polarization direction;

a polarization direction switching element which changes a polarization direction of the laser light to be entered into the beam splitter between the first polarization direction and the second polarization direction in accordance with a control signal; and a diffusing element which diffuses either one of the laser light transmitted through the beam splitter and the laser light reflected by the beam splitter.

5. An image display device, comprising:

a light source which emits laser light;

an optical element which is operable to switch between a first state for diffusing the laser light, and a second state for transmitting the laser light;

a switching control circuit which controls the optical element;

an imager which modulates the laser light transmitted through the optical element; and a modulation control circuit which controls the imager based on an image signal, wherein the switching control circuit sets the optical element to the first state when the imager displays an image in a direct viewing mode, and sets the optical element to the second state when the imager displays the image in a projection mode.

6. A portable terminal device, comprising:

an image display device including:

a light source which emits laser light;

an optical element which is operable to switch between a first state for reducing a coherence of the laser light, and a second state for substantially maintaining the coherence of the laser light;

a switching control circuit which controls the optical element;

an imager which modulates the laser light transmitted through the optical element; and a modulation control circuit which controls the imager based on an image signal, wherein the modulation control circuit causes the imager to render an image pattern for generating an image by changing a light amount at each pixel position when the optical element is in the first state, and causes the imager to render a hologram pattern for generating an image by diffraction when the optical element is in the second state.

7. The portable terminal device according to claim 6, wherein:

the optical element guides the laser light in a first direction when the optical element is in the first state, and guides the laser light in a second direction different from the first direction when the optical element is in the second state;

the imager includes a first imager into which the laser light propagating in the first direction is entered, and a second imager into which the laser light propagating in the second direction is entered; and the modulation control circuit causes the first imager to render the image pattern when the optical element is in the first state, and causes the second imager to render the hologram pattern when the optical element is in the second state.

8. The portable terminal device according to claim 6, wherein the optical element includes a liquid crystal element having orientations of liquid crystal molecules switched between an alignment state and a non-alignment state by controlling a voltage to be applied.

9. The portable terminal device according to claim 6, wherein the optical element includes:

a beam splitter which transmits the laser light having a first polarization direction, and reflects the laser light having a second polarization direction;

a polarization direction switching element which changes a polarization direction of the laser light to be entered into the beam splitter between the first polarization direction and the second polarization direction in accordance with a control signal; and a diffusing element which diffuses either one of the laser light transmitted through the beam splitter and the laser light reflected by the beam splitter.

* * * * *